United States Patent
Behera et al.

(10) Patent No.: US 12,244,562 B2
(45) Date of Patent: Mar. 4, 2025

(54) ALGORITHM TO DETECT MALICIOUS EMAILS IMPERSONATING BRANDS

(71) Applicant: Cisco Technology, Inc., San Jose, CA (US)

(72) Inventors: Durgamadhav Behera, Karnatakka (IN); Abhishek Singh, Morgan Hill, CA (US); Muhammad Sachedina, Calgary (CA)

(73) Assignee: Cisco Technology, Inc., San Jose, CA (US)

( * ) Notice: Subject to any disclaimer, the term of this patent is extended or adjusted under 35 U.S.C. 154(b) by 354 days.

(21) Appl. No.: 17/867,464

(22) Filed: Jul. 18, 2022

(65) Prior Publication Data

US 2023/0328034 A1 Oct. 12, 2023

(51) Int. Cl.
*H04L 9/40* (2022.01)
(52) U.S. Cl.
CPC ...... *H04L 63/0236* (2013.01); *H04L 63/1408* (2013.01); *H04L 63/1483* (2013.01)
(58) Field of Classification Search
CPC ............. H04L 63/0236; H04L 63/1408; H04L 63/1483
See application file for complete search history.

(56) References Cited

U.S. PATENT DOCUMENTS

| | | | |
|---|---|---|---|
| 10,601,865 B1 | 3/2020 | Mesdaq et al. | |
| 10,764,313 B1 | 9/2020 | Mushtaq | |
| 2016/0119377 A1* | 4/2016 | Goldberg | H04L 63/1408 726/12 |
| 2016/0352772 A1 | 12/2016 | O'Connor | |
| 2017/0230406 A1* | 8/2017 | Gould | H04L 63/08 |
| 2018/0012184 A1* | 1/2018 | Shraim | H04L 63/1483 |
| 2019/0319905 A1* | 10/2019 | Baggett | H04L 51/212 |
| 2020/0279225 A1 | 9/2020 | Li | |
| 2021/0027306 A1 | 1/2021 | Somaraju et al. | |
| 2021/0248624 A1 | 8/2021 | Keren et al. | |

FOREIGN PATENT DOCUMENTS

EP 1863240 A2 12/2007

OTHER PUBLICATIONS

PCT Search Report and Written Opinion mailed Jun. 21, 2023 for PCT application No. PCT/US23/17530, 12 pgs.

* cited by examiner

Primary Examiner — Abiy Getachew
(74) Attorney, Agent, or Firm — Lee & Hayes, P.C.

(57) ABSTRACT

Techniques for an email-security system to screen emails, extract information from the emails, analyze the information, assign probability scores to the emails, and classify the emails as likely fraudulent or not. The system may analyze emails for users and identify fraudulent emails by analyzing the contents of the emails. The system may evaluate the contents of the emails to determine probability score(s) which may further determine an overall probability score. The system may then classify the email as fraudulent, or not, and may perform actions including blocking the email, allowing the email, flagging the email, etc. In some instances, the screened emails may include legitimate brand domain addresses, names, images, URL(s), and the like. However, the screened emails may contain a reply-to domain address that matches a free email service provider domain. In such instances, the email-security system may assign a probability score indicative that the screened email is fraudulent.

20 Claims, 10 Drawing Sheets

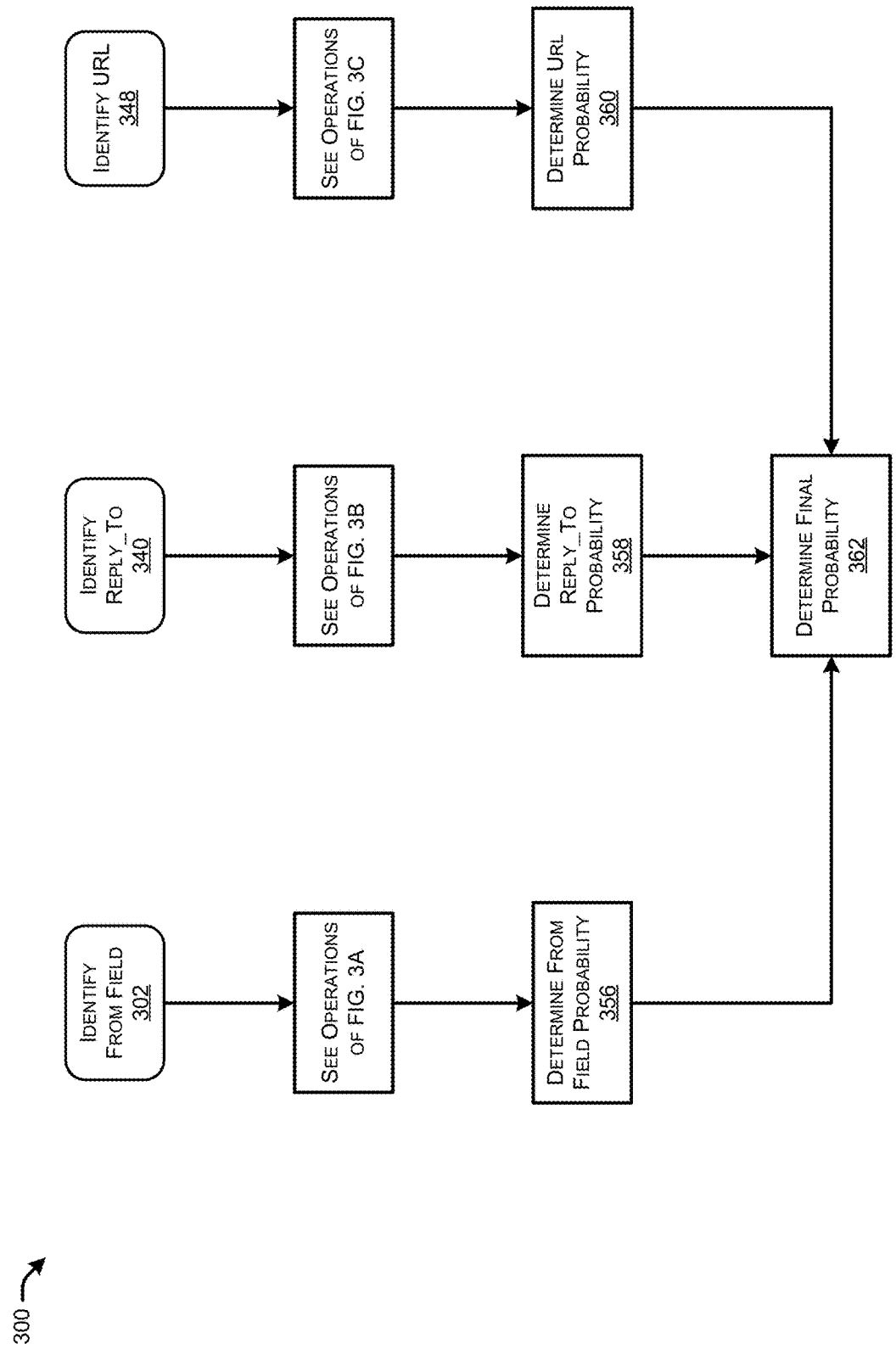

ALGORITHM TO DETECT MALICIOUS EMAILS IMPERSONATING BRANDS

RELATED APPLICATIONS

This application claims priority to Indian Provisional Patent Application No. 202241020887, filed on Apr. 7, 2022, the entire contents of which are incorporated herein by reference.

TECHNICAL FIELD

The present disclosure relates generally to techniques for an email-security system to detect malicious email impersonating brands.

BACKGROUND

Electronic mail, or "email," continues to be a primary method of exchanging messages between users of electronic devices. Many email service providers have emerged that provide users with a variety of email platforms to facilitate the communication of emails via email servers that accept, forward, deliver, and store messages for the users. Email continues to be an important and fundamental method of communications between users of electronic devices as email provide users with a cheap, fast, accessible, efficient, and effective way to transmit all kinds of electronic data. Email is well established as a means of day-to-day, private communication for business communications, marketing communications, social communications, educational communications, and many other types of communications.

Due to the widespread use and necessity of email, scammers and other malicious entities use email as a primary channel for attacking users, such as by business email compromise (BEC) attacks, malware attacks, and malware-less attacks. These malicious entities continue to employ more frequent and sophisticated social-engineering techniques for deception and impersonation (e.g., phishing, spoofing, etc.). As users continue to become savvier about identifying malicious attacks on email communications, malicious entities similarly continue to evolve and improve methods of attack.

Accordingly, email security platforms are provided by email service providers (and/or third-party security service providers) that attempt to identify and eliminate attacks on email communication channels. For instance, cloud email services provide secure email gateways (SEGs) that monitor emails and implement pre-delivery protection by blocking email-based threats before they reach a mail server. These SEGs can scan incoming, outgoing, and internal communications for signs of malicious or harmful content, signs of social engineering attacks such as phishing or business email compromise, signs of data loss for compliance and data management, and other potentially harmful communications of data. However, with the rapid increase in the frequency and sophistication of attacks, it is difficult for email service providers to maintain their security mechanisms at the same rate as the rapidly changing landscape of malicious attacks on email communications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3D illustrates a flow diagram of an example method for an email-security system to determining an overall probability indicating whether an email is an authentic email or a fraudulent email.

DESCRIPTION OF EXAMPLE EMBODIMENTS

Overview

Figure 1:
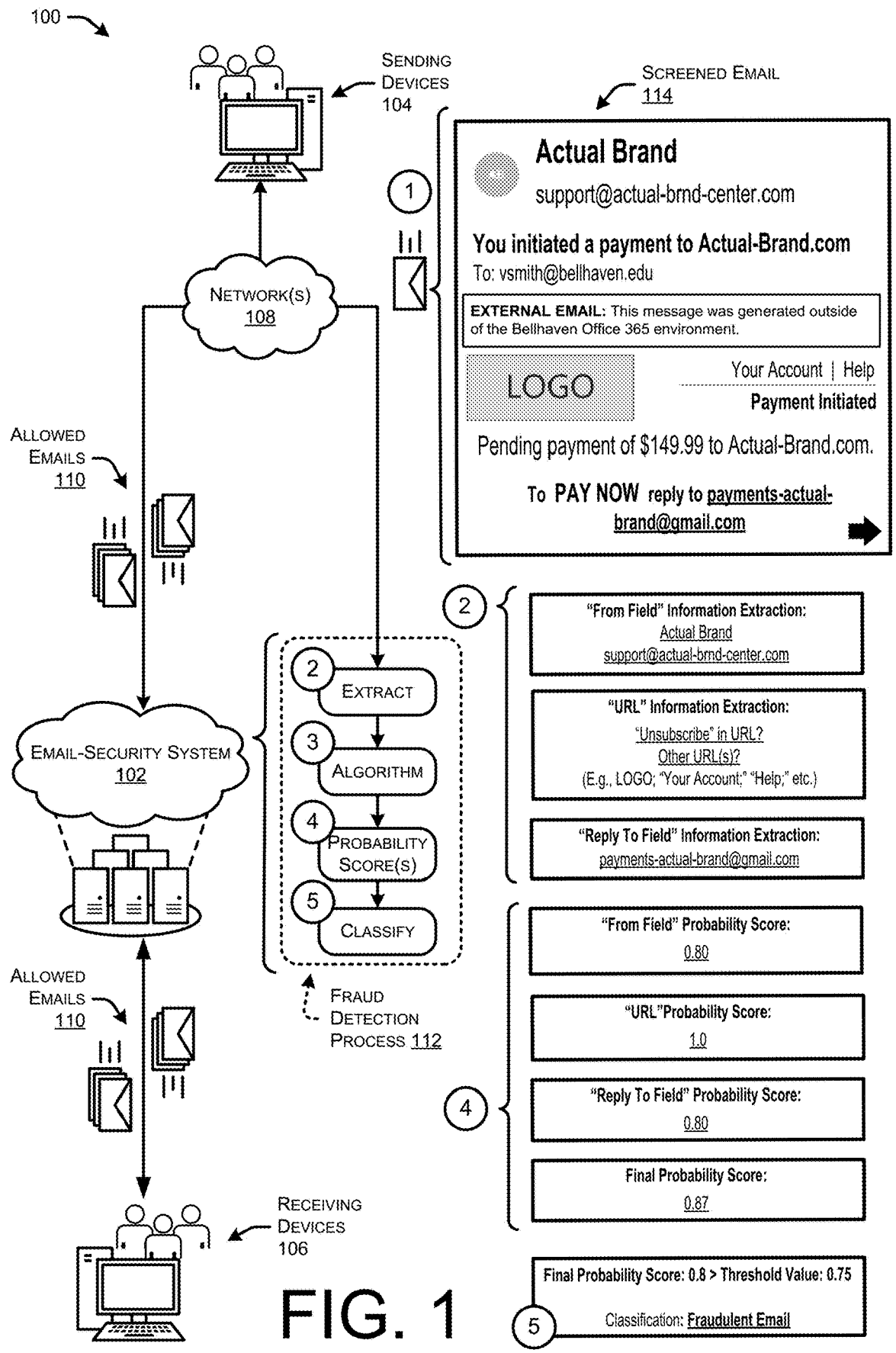
FIG. 1 illustrates a system-architecture diagram of an example email-security system that detects, assigns a probability score, and classifies an email indicating a likelihood of a fraudulent email.

This disclosure describes techniques for an email-security system to detect and assign probability scores to emails that indicate likelihoods of the emails being fraudulent impersonations of brands. A method to perform the techniques described herein includes obtaining, at an email-security system, an email sent from a sending device to a receiving device. The method may further include extracting, from the email, first data representing a from field of the email, second data representing a Uniform Resource Locator (URL) in the email, and third data representing a reply-to address. Further, the method may include determining, using the first data, a first probability value indicating a first likelihood that the from field of the email is impersonating a brand. Even further, the method may include determining, using the second data, a second probability value indicating a second likelihood that the URL in the email is impersonating the brand. Further, the method may include determining, using the third data, a third probability value indicating a third likelihood that the reply-to address in the email is impersonating the brand and determining, using the first probability value, the second probability value, and the third probability value, an overall probability value indicating an overall likelihood that the email is a malicious email that is impersonating the brand.

Additionally, the techniques described herein may be performed by a system and/or device having non-transitory computer-readable media storing computer-executable instructions that, when executed by one or more processors, performs the method described above.

Example Embodiments

This disclosure describes techniques for an email-security system to detect and assign probability scores to emails that indicate likelihoods of the emails being fraudulent impersonations of brands. The email-security system may analyze the information contained within the emails for users and identify fraudulent emails by analyzing metadata and/or contents of the emails using rule-based analysis, recognition analysis, probabilistic analysis, machine-learning (ML) models, and so forth. The email-security system may then assign the screened emails probability scores indicative of fraud, based at least in part on the extracted and analyzed information. The email-security system may then classify the screened emails as fraudulent or not, based at least in part on the assigned probability score. The assigned probability score may be compared to a predetermined threshold value that is indicative of a high likelihood of fraudulent impersonations of brands. In this way, the email-security system is able to classify emails may as fraudulent or authentic and prevent potential malicious attacks on users.

Thus, the email-security system may monitor emails communicated between users of email platforms or services to detect scam emails, phishing emails, and/or other malicious emails. The email-security system may screen emails for monitoring and extracting information for analysis. The email-security system may extract meaningful metadata from emails to determine whether the emails are scam emails or otherwise malicious. Meaningful metadata may include, for example, "From-Field" addresses and/or brand names for the email, "URL" addresses contained within the email, "Reply-To Field" addresses and/or brand names of the email, a Date/Time the email was communicated, attachments and/or hashes of attachments to the email, URLs in the body of the email and/or associated with unsubscribe actions, and so forth. In some instances, the metadata may additionally, or alternatively, include content included in the body of the email, actual attachments to the email, and/or other data of the email that may be private or confidential. Further, the metadata extracted from the email may generally be any probative information for the email security platform to determine whether an email is potentially malicious.

The email-security system may be configured to identify scam emails, which are often are designed to impersonate legitimate brands and are sent from the attackers to facilitate the scam. For instance, an initial email may be sent from the attacker that includes a request for the target user to perform an action based on the type of scam. For instance, the initial email may request a gift card code, may request a wire transfer, may request that salary be deposited into a different bank account, list of unpaid invoices, W-2 details of employee(s), sensitive information of clients, and so forth. Accordingly, impersonation (e.g., fraudulent) emails may need to be processed to determine the legitimacy of the email.

In some instances, processing of the extracted metadata may be initiated to analyze the extracted metadata to determine a first probability score indicative of a likelihood of scam emails, phishing emails, and/or other malicious emails. The processing may include determining a display name from the "From-Field" of the email. Any determined display name may further be determined to be identified with a person and/or legitimate brand (e.g., organization). Additionally, the processing may determine, from any extracted image metadata, any person and/or legitimate brand names contained within an image text within an associated file of the image. The email-security system may then determine whether, from the extracted metadata, the legitimate brand is found and whether the display name from the email matches a redundant legitimate brand name. Further, the email-security system may determine an address domain from the "From-Field" of the email. The processing by the email-security system may determine whether the address domain matches a free email service. The address domain may further be compared to the legitimate brand name to determine a similarity. Further, the processing may take the determinations and combine them into the first probability score. The determinations may be equally weighted or have differing weights when factored together to determine the first probability score.

In some further instances, processing of the extracted metadata may be initiated to analyze the extracted metadata to determine a second probability score indicative of a likelihood of scam emails, phishing emails, and/or other malicious emails. The processing may include determining a domain name from the "Reply-To Field" of the email. The domain name may be compared to the free email service to determine any similarities. Additionally, the domain name from the "Reply-To Field" may be compared to the address domain from the "From-Field" to determine any similarities. Further, the processing may take the determinations and combine them into the second probability score. The determinations may be equally weighted or have differing weights when factored together to determine the second probability score.

In some other instances, processing of the extracted metadata may be initiated to analyze the extracted metadata to determine a third probability score indicative of a likelihood of scam emails, phishing emails, and/or other malicious emails. The processing may include determining any "URL" contained within the email. The processing may further include comparing the URL contained within the email to the address domain from the "From-Field" to determine any similarities. Further, the processing may include determining any URL associated with the unsubscribe action contained within the email. Any URL associated with the unsubscribe action may further be compared to the URL found within the email, the address domain from the "From-Field," and any URL associated with the image text from the "From-Field" to determine any matches. Further, the processing may take the determinations and combine them into the third probability score. The determinations may be equally weighted or have differing weights when factored together to determine the third probability score.

In some further instances, processing of the extracted metadata may be initiated to analyze the extracted metadata to determine a fourth probability score indicative of a likelihood of scam emails, phishing emails, and/or other malicious emails. The processing may include determining any owners (e.g., registrants, etc.) and/or legitimate brands associated with WHOIS and/or certification(s) resulting from the extracted metadata of the email. The processing may include locating, from the extracted metadata, any respective WHOIS and/or certificates. Further, the processing may include determining, from the respective WHOIS and/or certificates, any associated owner. Additionally, the processing may determine any legitimate brand associated with the determined owner. Further, the processing may compare the extracted metadata to any determined legitimate brand associated with the owner and determine any similarities. Additionally, the processing may take the determinations and combine them into the fourth probability score. The determinations may be equally weighted or have differing weights when factored together to determine the fourth probability score.

The email-security system may be configured to process the one or more probability scores to determine a final probability score. The determination of the final probability score may be by making the one or more probability scores equally weighted or assigning them differing weights to factor together and determine the final probability score. The final probability score may then be assigned a classification indicative that the emails are scam emails or otherwise malicious. As such, the classification may be based upon exceeding a predetermined threshold value. For example, the predetermined threshold value may be assigned to be a threshold probability value of 0.75. As such, the final probability score exceeding the threshold probability score may render the classification of a fraudulent email to the processed email.

Processing, as described above is merely exemplary of one possible method of determining the final probability score. In some instances, a machine-learning (ML) model(s) may be trained and used to determine the final probability score from the extracted metadata. In some further instances, the processing may compare the extracted metadata to a storage of valid domain(s), saved brand possibilities, saved past fraudulent email(s), and the like. Additionally, the foregoing may not be construed as limiting and it may be appreciated that additional processing methods may become apparent to one skilled in the art.

After initially classifying a fraudulent email based upon the final probability score, the email-security system may further classify the scam emails into different classes from amongst a group of scam email classes. For instance, scam emails may be classified into one or more of a gift-card scam class, a wire-transfer scam class, a payroll-account scam class, an invoice scam class, an account-acquisition scam class, a phone scam class, a W-2 scam class, an aging report scam class, a merger and acquisition scam class, an executive forgery scam class, an attorney scam class, a tax client scam, an initial lure or rapport scam class, and so forth. The email-security system may utilize a secondary classification scan using email policies.

Once a scam email has been detected and classified into its respective category, it will get quarantined and not sent to an inbox of the target user. Additionally, the extracted metadata from the scam email may be placed into storage. For instance, the scam email may be sored in the save past fraudulent email(s) storage. Additionally, the metadata and/or subsequent processing may serve to train the ML model(s). Further, at least a portion of the extracted metadata from the emails may be retained (e.g., saved) to the storage. For instance, the impersonated brand names extracted from the email may be stored in the saved brand possibilities. In some further instances, legitimate domain(s) extracted from the emails may be stored in the storage under valid domains. Additionally, other information from the metadata may be stored in an array of different ways that are the same and/or similar to those described and alluded to herein and/or as may be apparent to one skilled in the art.

The fraudulent emails are quarantined, and the email-security system may prevent any further communication received from sender and/or further communication sharing similarities with the fraudulently classified, screened email. The email-security system may implement various additional remedial actions. The remedial actions may include harvesting the attacker information for additional detection rules, blocking the fraudulent email, reporting the attacker information to authorities, and so forth.

While the systems and techniques described herein are generally applicable for any type of malicious, impersonation email, fraudulent emails (often BEC attacks) are prominent threats that may be detected and mitigated according to the techniques described herein. BEC fraudulent emails include various types or classes, such as wire-transfer scams, gift card scams, payroll scams, invoice scams, acquisition scams, aging report scams, phone scams, a W-2 scam class, an aging report scam class, a merger and acquisition scam class, an executive forgery scam class, an attorney scam class, a tax client scam, an initial lure or rapport scam class, and so forth. In some instances, the fraudulent attacks result in an organization or person under attack losing money or other financial resources. Additionally, or alternatively, the organization or person under attack may lose valuable information, such as trade secrets or other information. These types of fraudulent are often multi-stage attacks. Often, in the first stage, the attacker sends a fake email to the victim who is usually a manager or employee in the organization. This fake email may impersonate a real person who is also a legitimate employee of an organization to build a rapport and an official tone to the message. The fake email may accordingly or alternatively, impersonate a brand and the email itself may be of a sophisticated construction including real domains and/or hyperlinks directed to the actual brand in an attempt to legitimize the email while requesting an action directed to a fraudulent domain and/or hyperlink. Once the victim succumbs to the fraudulent and follows the instructions found in the fraudulent email, the victim then transfers money to the attacker, either in the form of transfer to a bank account or sending gift card credentials to an email address.

The term "brand," as used and alluded to herein may be interchangeable with the term "organization," "legitimate business," and the like. Brand may also mean an "enterprise," "collaboration," "government," "agencies," "any type of organization of people," an "entity representative of some grouping of people," etc. Furthermore, brand may also represent an intangible marketing and/or business concept that helps individuals identify the legitimacy of the brand, company, individual, collaboration, and the like by which the brand is associated.

Some of the techniques described herein are with reference to fraudulent emails. However, the techniques are generally applicable to any type of malicious email. As described herein, the term "malicious" may be applied to data, actions, attackers, entities, emails, etc., and the term "malicious" may generally correspond to spam, phishing, spoofing, malware, viruses, and/or any other type of data, entities, or actions that may be considered or viewed as unwanted, negative, harmful, etc., for a recipient and/or destination email address associated with an email communication.

Certain implementations and embodiments of the disclosure will now be described more fully below with reference to the accompanying figures, in which various aspects are shown. However, the various aspects may be implemented in many different forms and may not be construed as limited to the implementations set forth herein. The disclosure encompasses variations of the embodiments, as described herein. Like numbers refer to like elements throughout.

FIG. 1 illustrates a system-architecture diagram 100 of an example email-security system 102 that detects, assigns a probability score, and classifies an email indicating a likelihood of a fraudulent email.

In some instances, the email-security system 102 may be a scalable service that includes and/or runs on devices housed or located in one or more data centers, that may be located at different physical locations. In some examples, the email-security system 102 may be included in an email platform and/or associated with a secure email gateway platform. The email-security system 102 and the email platform may be supported by networks of devices in a public cloud computing platform, a private/enterprise computing platform, and/or any combination thereof. The one or more data centers may be physical facilities or buildings located across geographic areas that designated to store networked devices that are part of and/or support the email-security system 102. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth).

The email-security system 102 may be associated with an email service platform may generally comprise any type of email service provided by any provider, including public email service providers (e.g., Google Gmail, Microsoft Outlook, Yahoo! Mail, AIL, etc.), as well as private email service platforms maintained and/or operated by a private entity or enterprise. Further, the email service platform may comprise cloud-based email service platforms (e.g., Google G Suite, Microsoft Office 365, etc.) that host email services. However, the email service platform may generally comprise any type of platform for managing the communication of email communications between clients or users. The email service platform may generally comprise a delivery engine behind email communications and include the requisite software and hardware for delivering email communications between users. For instance, an entity may operate and maintain the software and/or hardware of the email service platform to allow users to send and receive emails, store and review emails in inboxes, manage and segment contact lists, build email templates, manage and modify inboxes and folders, scheduling, and/or any other operations performed using email service platforms.

The email-security system 102 may be included in, or associated with, the email service platform. For instance, the email-security system 102 may provide security analysis for emails communicated by the email service platform (e.g., as a secure email gateway). Furthermore, a second computing infrastructure may comprise a different domain and/or pool of resources used to host the email service platform.

The email service platform may provide one or more email services to users of user device to enable the user devices to communicate emails. Sending devices 104 may communicate with receiving devices 106 over one or more networks 108, such as the Internet. In some instances, the network(s) 108 may generally comprise one or more networks implemented by any viable communication technology, such as wired and/or wireless modalities and/or technologies. The network(s) 108 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 108 may include devices, virtual resources, or other nodes that relay packets from one device to another.

As illustrated, the user devices may include the sending devices 104 that send emails and the receiving devices 106 that receive the emails. The sending devices 104 and receiving devices 106 may comprise any type of electronic device capable of communicating using email communications. For instance, the devices 104/106 may include one or more of different personal user devices, such as desktop computers, laptop computers, phones, tablets, wearable devices, entertainment devices such as televisions, and/or any other type of computing device. Thus, the user devices 104/106 may utilize the email service platform to communicate using emails based on email address domain name systems according to techniques known in the art.

The email service platform may receive emails that are destined for the receiving device 106 that have access to inboxes associated with destination email addresses managed by, or provided by, the email service platform. That is, emails, including allowed emails 110, are communicated over the network(s) 108 to one or more recipient servers of the email service platform, and the email service platform determines which registered user the email is intended for based on email information such as "To," "Cc," Bcc," and the like. In instances where a user of the receiving device 106 have registered for use of the email-security system 102, an organization managing the user devices 104/106 has registered for use of the email-security system 102, and/or the email service platform itself has registered for use of the email-security system 102, the email service platform may provide the appropriate emails to the front end for pre-preprocessing of the security analysis process.

Generally, the email-security system 102 may perform at least metadata extraction techniques on the emails and may further perform content pre-classification techniques on the emails in some instances. The types of metadata that may be scanned for, and extracted by, the email-security system 102 includes indications of the "Reply-To Field" email address(es), the "From-Field" email address(es), the "Image" information of the emails, the "Subject" of the emails, the Date/Time associated with communication of the emails, indications of universal resource locator (URL) or other links in the emails, attachment files, hashes of attachments, fuzzy hashes extracted from the message body of the emails, content from the body of the email, etc. Generally, the email service platform and/or users of the email security platform may define what information is permitted to be scanned and/or extracted from the emails, and what information is too private or confidential and is not permitted to be scanned and/or extracted from the emails.

Upon extracting metadata (or "features") from the emails that is to be used for security analysis, the email-security system 102 may perform security analysis on the email metadata using, among other techniques, security policies defined for the email security platform. The security policies may be defined or created by the email-security system 102 to detect potentially malicious emails, and/or be defined and/or created by administrators or other users of the email-security system 102. The email security system 102 may analyze the email metadata with reference to the security policies to determine whether or not the email metadata violates one or more security policies that indicate the respective email is potentially malicious. In some instances, impersonated email probability sequencing may be developed to identify malicious emails based on different words, patterns, and/or other information included in the emails. As another example, ML model(s) may be trained using emails where malicious emails are labeled as malicious and benign or normal emails are labeled as benign. The ML model(s) and/or the impersonated email probability sequencing may output probabilities that emails are malicious or may simply output a positive or negative result as to whether the emails are malicious or not.

The email-security system 102 may analyze and detect non-malicious emails, or allowed emails 110, and permit the allowed emails 110 to be communicated between the user devices 104/106. In some instances the email-security system 102 analyzes emails and detects that the emails are in fact malicious emails, such as fraudulent emails.

As shown, the email-security system 102 may initiate a fraud detection process 112 to detect, at "1," a screened email 114 that is sent from a sending device 104 (e.g., attacker) and to a receiving device 106 (e.g., target, victim, etc.). After detecting the screened email 114, the email-security system 102 may, at "2," extract form the screened email 114 information from the "From-Field," any "URL" information, information from the "Reply-To Field," and the like of the screened email 114. The email-security system may utilize a secondary classification scan using email policies. The screened email 114 may be tested against algorithms (e.g., models) at "3," such as natural language processing NLP model(s), to classify the screened email 114 into a particular class. The NLP model(s) analyze the collected information of the fraudulent email and assigns, at "4," a probability score to the fraudulent email.

In the illustrated example, the screened email 114 is a request for the target user to send a payment of money in the amount of $149.99. The attacker may have impersonated the name of an "Actual Brand" that may be familiar to the victim and that is permitted to request such types of payment and pretend to be acting on behalf of the brand, in this case directing the victim to make a payment via a reply to a "PAY NOW" domain. As shown, the reply-to address associated with the "PAY NOW" call to action appears to be legitimate, containing elements (e.g., words) associated with the impersonated brand.

As shown, the email-security system 102 may, at "4," compute probability score(s) associated with the email. After testing the collected information using the algorithms, at "3," one or more probability scores may be determined. For example, probability scores may be independently determined for information collected from the "From-Field," any "URL" information, information from the "Reply-To Field," and the like. In some instances, multiple independently assigned probability scores may be further combined into a "Final Probability Score" representative of a collective probability score for the email. The "Final Probability Score" may be an average of the one or more probability scores, a weighted average, and/or any other method of combination as may be appreciated by one skilled in the art.

In the illustrated example, the screened email 114 is assigned four separate probability scores. After analysis of the "From-Field," a probability score of 0.80 was determined by the algorithm at "3." Additionally, at "3," the algorithm determined a probability score of 1.0 for the "URL," a score of 0.80 for the "Reply-To Field," and a score of 0.87 as a "Final Probability Score."

After computing and assigning a probability score, at "4," to the screened email 114, the email-security system 102 may, at "5," classify the screened email 114 as fraudulent or not. Classification of the screened email 114 as fraudulent may be achieved by comparing the probability score (e.g., "Final Probability Score") to a predetermined threshold value. In some instances, the predetermined threshold value may be assigned to be a value of 0.75. In such instances, a probability score exceeding the threshold value may result in a classification of the email as fraudulent. As such, classification as fraudulent may ensure that the email 114 is not sent to the receiving device 106 on which the victim is reading emails.

In the illustrated example, the screened email 114 received a "Final Probability Score" of 0.87 as an average of probability scores determined for the "From Field," "URL," and "Reply-To Field." As such, the "Final Probability Score" of 0.87 exceeded the threshold value of 0.75 and the screened email 114 was classified, at "5," as a fraudulent email.

Figure 2:
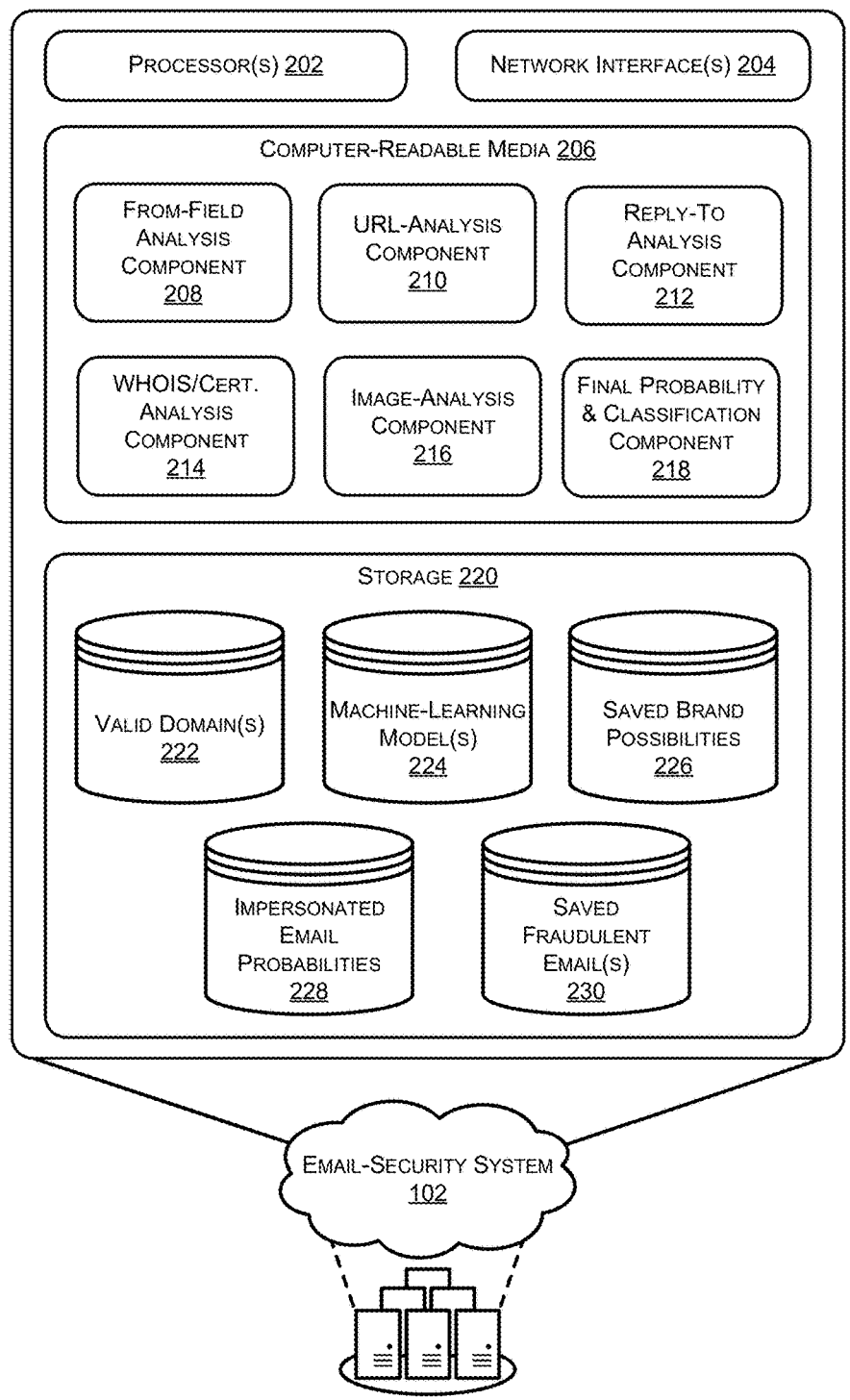
FIG. 2 illustrates a component diagram of an example email-security system that detects, assigns a probability score, and classifies an email indicating a likelihood of a fraudulent email.

FIG. 2 illustrates a component diagram 200 of an example email-security system 102 that detects, assigns a probability score, and classifies an email indicating a likelihood of a fraudulent email. As illustrated, the email-security system 102 may include one or more hardware processors 202 (processors), one or more devices, configured to execute one or more stored instructions. The processor(s) 202 may comprise one or more cores. Further, the email-security system 102 may include one or more network interfaces 204 configured to provide communications between the email-security system 102 and other devices, such as the sending device(s) 104, receiving devices 106, and/or other systems or devices associated with an email service providing the email communications. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth.

The email-security system 102 may also include computer-readable media 206 that stores various executable components (e.g., software-based components, firmware-based components, etc.). The computer-readable-media 206 may store components to implement functionality described herein. While not illustrated, the computer-readable media 206 may store one or more operating systems utilized to control the operation of the one or more devices that comprise the email-security system 102. According to one instance, the operating system comprises the LINUX operating system. According to another instance, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

The computer-readable media 206 may include portions, or components, that configure the email-security system 102 to perform various operations described herein. For instance, a from-field analysis component 208 may be configured to, when executed by the processor(s) 202, perform various techniques for analyzing particular email information to determine probability scores indicative of fraud. The from-field analysis component 208 may utilize policies or rules to analyze email metadata to determine if the corresponding email is malicious. The from-field analysis component 208 may perform various types of security analysis techniques, such as determining whether one or more of the following "Display Name" and "From," "To", "Cc," and/or "Bcc" email addresses are associated with legitimate brand names, email addresses, and/or email domains and/or free email service email addresses and/or email domains.

The computer-readable media 206 may further include a URL analysis component 210 that configure the email-security system 102 to perform various operations described herein. For instance, the URL analysis component 210 may be configured to, when executed by the processor(s) 202, perform various techniques for analyzing particular email information to determine probability scores indicative of fraud. The URL analysis component 210 may utilize policies or rules to analyze email metadata to determine if the corresponding email is malicious. The URL analysis component 210 may perform various types of security analysis techniques, such as determining whether one or more of the following "URL" and/or "Unsubscribe URL" are associated with legitimate brand URL(s).

The computer-readable media 206 may further include a reply-to analysis component 212 that configure the email-security system 102 to perform various operations described herein. For instance, the reply-to analysis component 212 may be configured to, when executed by the processor(s) 202, perform various techniques for analyzing particular email information to determine probability scores indicative of fraud. The reply-to analysis component 212 may utilize policies or rules to analyze email metadata to determine if the corresponding email is malicious. The reply-to analysis component 212 may perform various types of security analysis techniques, such as determining whether the "To" email address(es) are associated with legitimate brand names, email addresses, and/or email domains and/or free email service email addresses and/or email domains.

The computer-readable media 206 may further include a WHOIS/Certification analysis component 214 that configure the email-security system 102 to perform various operations described herein. For instance, the WHOIS/Certification analysis component 214 may be configured to, when executed by the processor(s) 202, perform various techniques for analyzing particular email information to determine probability scores indicative of fraud. The WHOIS/Certification analysis component 214 may utilize policies or rules to analyze email metadata to determine if the corresponding email is malicious. The WHOIS/Certification analysis component 214 may perform various types of security analysis techniques, such as determining whether one or more of the following "Display Name" and "From," "To", "Cc," "Bcc," "Reply-To Field" information, URL(s) contained within the email, domains contained within the email, and/or email addresses contained within the email are associated with legitimate brand owners via names, email addresses, and/or email domains, cross referenced against associated WHOIS and/or Certificate information.

The computer-readable media 206 may further include an image analysis component 216 that configure the email-security system 102 to perform various operations described herein. For instance, the image analysis component 216 may be configured to, when executed by the processor(s) 202, perform various techniques for analyzing particular email information to determine probability scores indicative of fraud. The image analysis component 216 may utilize policies or rules to analyze email metadata to determine if the corresponding email is malicious. The image analysis component 216 may perform various types of security analysis techniques, such as determining whether one or more of the extracted metadata associated with images included in the email are associated with legitimate brand names, email addresses, and/or email domains.

The computer-readable media 206 may further include a final probability & classification component 218 that configure the email-security system 102 to perform various operations described herein. For instance, the final probability & classification component 218 may be configured to, when executed by the processor(s) 202, perform various techniques for averaging the probability scores determined from the components 208-216 to determine the final probability score indicative of fraud. The final probability & classification component 218 may utilize any one of the different types of averaging including determining a mean, a median, a weighted average, a mode, and/or the like. The final probability & classification component 218 may then compare the resulting final probability score to a predetermined threshold value to classify the email as a likelihood of being fraudulent. As described and alluded to herein, a final probability score exceeding the predetermined threshold value may be indicative of a fraudulent email classification.

The above-noted list of components and their respective processes are merely exemplary, and other types of security policies may be used to analyze the email metadata. The final probability and classification component 218 may then generate result data indicating a result of the security analysis of the email metadata using the policy(ies) stored in a storage 220.

Additionally, the email security-system 102 may include the storage 220 which may comprise one, or multiple, repositories or other storage locations for persistently storing and managing collections of data such as databases, simple files, binary, and/or any other data. The storage 220 may include one or more storage locations that may be managed by one or more storage/database management systems.

As illustrated, the storage 220 may include valid domain(s) 222, ML model(s) 234, saved brand possibilities 226, impersonated email probabilities 228, and saved fraudulent email(s) 230. It should be appreciated that the foregoing list is merely exemplary and the storage 220 may include additional elements that may be apparent to one skilled in the art.

The valid domain(s) 222 may include a database of domains determined to be valid (e.g., non-fraudulent domains). For instance, domains associated with the allowed emails 110 may be included in the valid domain(s) 222. The valid domain(s) 222 may include domains that are manually inputted, domains determined to not meet the predetermine threshold value, domains associated with legitimate brands, domains determined by ML model(s) 234, and the like.

The ML model(s) 224 may include a database of machine learning algorithms. The ML model(s) may include one or more algorithms including supervised, semi-supervised, unsupervised, and/or reinforcement. In some examples, the processor(s) 202 train(s) the email-security system 102 utilizing machine learning techniques, statistical analysis, or any other means by which a system may be trained to output fraudulent email detection based on input associated with screened email 114 information, established operating parameters from the computer-readable media 206, and/or production data associated with the storage 220.

The saved brand possibilities 226 may include a database of domains and/or a list of executives (e.g., owners, CEO(s), executive officers, etc.) found to be associated with legitimate brands. The database may be formed as a historical compilation of legitimate brands found from historical uses of the email-security system 102.

The impersonated email probabilities 228 may store the results and/or timeline of events from the final probability & classification component 218. Additionally, or alternatively, the impersonated email probabilities 228 may be a database of historical calculation results. As such, it may be used by the final probability & classification component 218 during its operation.

The saved fraudulent email(s) 230 may be a database of historically classified fraudulent email(s) that are saved. As such, the saved fraudulent email(s) 230 may be used by the final probability & classification component 218 during its operation. For example, the final probability & classification component 218 may reference the saved fraudulent email(s) 230 to determine similarities between screened emails 114 and previously classified, fraudulent emails.

The final probability and classification component 218 may, as described and alluded to herein, classify and email as fraudulent by a comparison to a threshold value where the probability score is in excess of the threshold value. In some instances, an email determined to be fraudulent may further be stored in the saved fraudulent email(s) 230 of the storage 220.

Figure 3A:
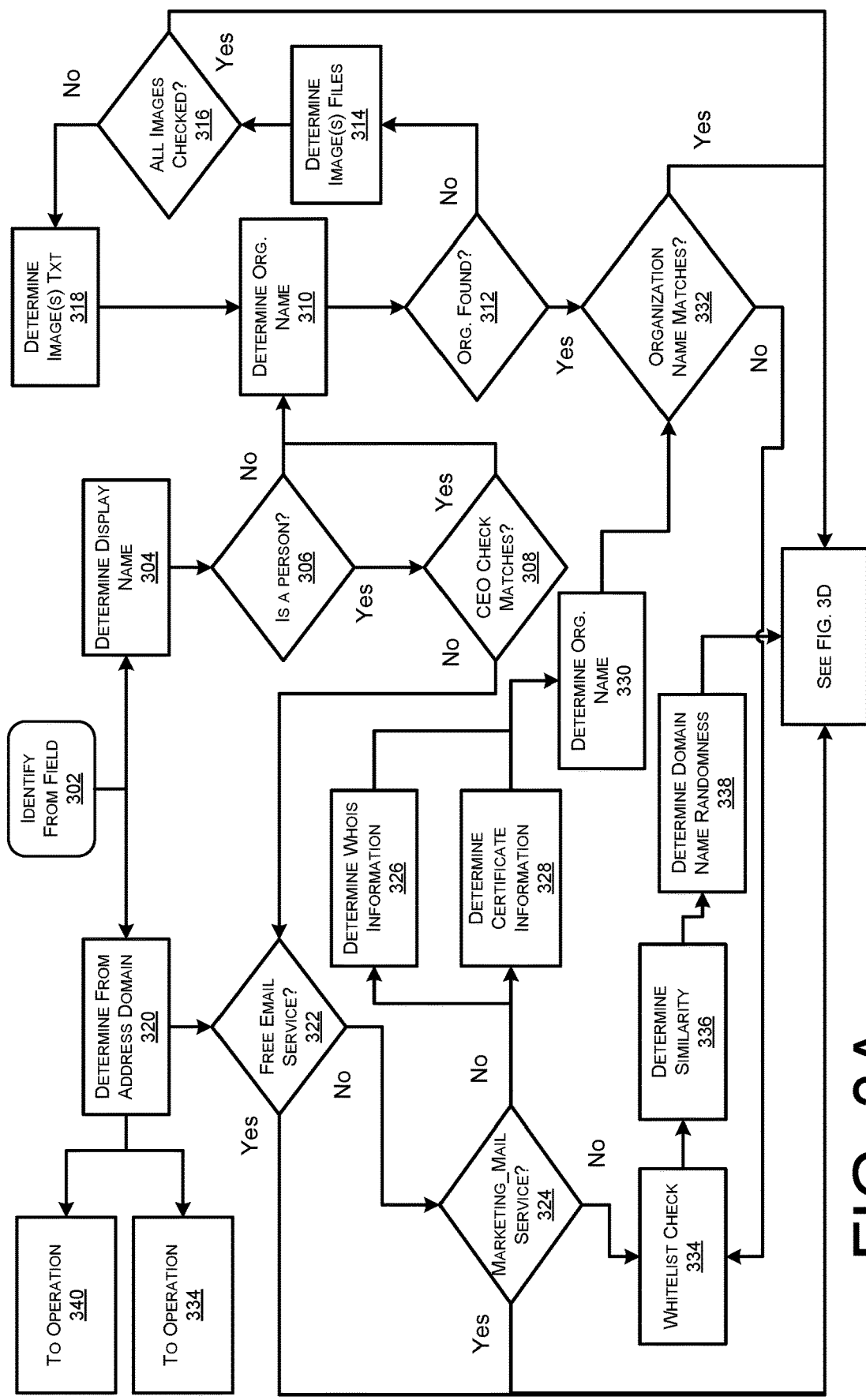
FIG. 3A illustrates a flow diagram of an example method for an email-security system to detect an email, assign a probability score, and use the probability score classify the email as an authentic email or a fraudulent email.

FIG. 3A illustrates a flow diagram of an example method 300 for extracting information and/or data from the "From-Field" of the screened email 114 of an email-security system that is further configured to detect an email, assign a probability score, and use the probability score classify the email as an authentic email or a fraudulent email. The email-security system 102 may monitor emails communicated between users of email platforms or services to detect fraudulent emails, phishing emails, and/or other malicious emails.

At 302, the from-field analysis component (hereinafter referred to as the "FF component") 208 may identify from-field information of a scanned email 114. The FF component 208 may identify the from-field information using text recognition, NLP model(s), predetermined field analysis, and the like.

At 304, the FF component 208 may determine a display name from the scanned email 114. For example, the FF component 208 may be directed to a portion of the scanned email 114 detailing the display name associated with the scanned email 114. In some other instances, the FF component 208 may use textual recognition and/or NLP model(s) to determine the display name of the from field of the scanned email 114.

At 306, the FF component 208 may determine whether the display name is a person or not. For example, the FF component 208 may compare the display name to a look-up table of names contained within the storage 220 and/or may conduct an internet search to determine CEO names. In some other instances, the FF component 208 may utilize ML model(s) 224 to determine whether the display name is a person or not. In some further instances, the FF component 208 may compare the display name to the saved brand possibilities 226 where matches may indicate that the display name is not a person.

A determination that the display name is a person (i.e., a "Yes" at operation 306) the method 300 may proceed to operation 308.

At 308, the FF component 208 may determine whether the display name matches a CEO. For example, the FF component 208 may compare the display name to a look-up table of CEO names contained within the storage 220 and/or may conduct an internet search to determine CEO names. In some other instances, the FF component 208 may utilize ML model(s) 224 to determine whether the display name matches the CEO of a legitimate brand. In some further instances, the FF component 208 may compare the display name to the saved brand possibilities 226 where CEO names may be stored and where matches may indicate that the display name matches an associated CEO.

A determination that the display name is not a person (i.e., a "No" at operation 306) the method 300 may proceed to operation 310. Additionally, a determination that the display name matches a CEO name associated with a legitimate brand (i.e., a "Yes" at operation 308) the method 300 may also proceed to operation 310.

At 310, the FF component 208 and/or image-analysis component (hereinafter referred to as the "IA component") 216 may determine any organization (i.e., brand name(s)) from the display name determined at operation 304. In some instances, FF component 208 and/or IA component 216 may determine any organization from the CEO name match determined at operation 308. The FF component 208 and/or IA component 216 may further determine any organization contained within any image file text found within the screened email 114. The FF component 208 and/or IA component 216 may use textual recognition and/or NLP model(s) to determine text associated with organization names. In other instances, the FF component 208 and/or IA component 216 may compare the image file text to the valid domains 222, the ML model(s), and/or the saved brand possibilities 226 contained within the storage 220. In some further instances, the FF component 208 and/or IA component 216 may utilize the network 108 to compare the image file text to lookup tables, organization search matches, internet searches, and/or the like.

At 312, the method 300 may determine whether the organization name has been found from the determination and/or information found at operation 310.

A determination that the organization was not found (i.e., a "No" at operation 312) the method 300 may proceed to operation 314.

At 314, the FF component 208 may determine any image(s) files. The FF component 208 may recognize images contained within the screened email 114 and access the files associated with the images. In some instances, there may be one or more images contained within the screened email 114. As such, the FF component 208 may determine the images' files. In some further instances, there may be no images contained within the screened email 114. As such, the FF component 208 may determine that there are no image files and may move onto the next operation. In some instances, the FF component 208, at operation 314, may determine image file(s) one at a time. In some other instances, the FF component 208 may determine one image file and move onto the next operation before returning to determine any subsequent image file contained within the screened email 114.

At 316, the FF component 208 may determine whether image(s) within the screened email 114 have been checked and whether any image(s) remain unchecked. For instance, the method 300 may, as described and alluded to herein, determine any image(s) contained within the screened email 114 one at a time. In some other instances, the method 300 may determine any image(s) contained within the screened email 114 at once. In any case, the method 300, at operation 316, may determine whether the FF component 208 has checked every image(s) within the screened email 114.

A determination that at least one image within the screened email 114 remains unchecked (i.e., a "No" at operation 316) the method 300 may proceed to operation 318.

At 318, the FF component 208 may determine the text (txt) contained within the image files determined at operation 308. For example the FF component 208 may use a Tesseract OCR software to perform optical character recognition (OCR) on a text corpus. In some other instances, the FF component 208 may use TensorFlow, OpenCV, Google Cloud Vision API, Amazon Rekognition, and/or any other suitable method for determining txt contained within any image files. From operation 318, the method 300 may proceed back to operation 310.

At 320, the FF component 208 may determine a from address domain. For example, the FF component 208 may be directed to a portion of the scanned email 114 detailing the display name associated with the scanned email 114. In some other instances, the FF component 208 may use textual recognition and/or NLP to determine the display name of the from field of the scanned email 114.

Following operation 320, the method 300 may proceed to operation 322. Additionally, a determination that the CEO check does not match the person determined within the display name (i.e., a "No" at operation 308) the method 300 may proceed to operation 322.

At 322, the FF component 208 may compare the determined from address domain, at operation 320, to determine whether the from-field domain address matches any free email service domains or not. For example, the FF component 208 may determine, at operation 320, that the from address domain is "from@realbrand.com." The FF component 208 may, at operation 322, determine that the domain (i.e., "@realbrand.com") does not match any free email service domains such as "@gmail.com," "@yahoo.com," "@hotmail.com," and/or the like. Additionally, the method 300 may compare the name of the person and/or display name determined not to match a CEO, determined not to match at operation 308, to determine whether the display name matches any free email service domains or not, in a the similar and/or same way as described and alluded to above. As such, the method 300 may proceed to the next operation.

A determination that the from address domain, determined at operation 320, does not match any free email service domains (i.e., a "No" at operation 322) may cause the method 300 will proceed to operation 324.

At 324, the FF component 208 of the method 300 may determine, from the information used at operation 322, whether that information matches any marketing mail service domains and/or names. For instance, the method may compare the information to email marketing services including "HubSpot," "Omnisend," "AWeber," "Drip," and/or the like.

A determination that the information compared, at operation 324, does not match any marketing mail service(s) (i.e., a "No" at operation 324) the method 300 may proceed to operations 326, 328, and 334 (Discussed in further detail below).

At 326, the FF component 208 may determine, from the information collected at operations 304 and/or 320, an associated whois database. From the whois database, the FF component 208 may collect a registrant organization name and a whois age data.

At 328, the FF component 208 may determine, from the information collected at operation 304 and/or 320, an associated secure sockets layer (SSL) certificate. From the SSL certificate, the FF component 208 may collect organization name details.

At 330, the FF component 208 may determine any organization (i.e., brand name(s)) from the display name determined at operation 304 and/or the address domain determined at 320 and the whois information determined at operation 326 and/or the certificate information determined at operation 328. The FF component 208 may use textual recognition and/or NLP model(s) to determine text associated with organization names. In other instances, the FF component 208 may compare the information collected at operations 304, 320, 326, and/or 328 to the valid domains 222, the ML model(s), and/or the saved brand possibilities 226 contained within the storage 220. In some further instances, the FF component may utilize the network 108 to compare the information collected at operations 304, 320, 326, and/or 328 to lookup tables, organization search matches, internet searches, and/or the like.

Upon completion of operation 330, the method 300 may proceed to operation 332. Additionally, a determination that that the organization was found (i.e., a "Yes" at operation 312) the method 300 may also proceed to operation 332.

At 332, the FF component 208 may determine if the information, progressing naturally from operations 304 and 320, matches an organization name through comparison. For instance, at operation 312 the method 300 determined that an organization was found. As such, the FF component 208 may search the saved brand possibilities 226 and determine whether the organization found, at operation 312, matches a legitimate brand. In some other instances, the FF component 208 may compare the organization found at operation 312 to the valid domains 222, the ML model(s) 224, the impersonated email probabilities 228, and/or the saved fraudulent emails 230. In some further instances, the FF component 208 may conduct an internet search to determine whether the organization determined at operation 312 matches a legitimate brand. Additionally, at operation 332, the method 300 may determine whether the organization name, determined at operation 330, matches a legitimate brand. As such, the FF component 208 may determine whether a match exists using the same and/or similar processes as described and alluded to above and/or herein and/or as may be apparent to one skilled in the art.

A determination that the organization name does not match a legitimate brand (i.e., a "No" at operation 332) the method 300 may continue to operation 334. Additionally, a determination that the information compared, at operation 324, does not match any marketing mail service(s) (i.e., a "No" at operation 324) the method 300 may proceed to operations 334.

At 334, the FF component 208 may conduct a whitelist check of the from address domain, determined at operation 320 and determined to not be associated with a free email service or marketing mail service, at operations 322 and 324, respectively. For example, the whitelist may include a list of email addresses, IP addresses, domain names, applications, and/or the like which are designated as approved. As such, the whitelist may automatically block and/or flag any of the aforementioned list items.

At 336, the FF component 208 may determine a similarity between the from address domain and the whitelist items. The FF component 208 may use a similarity logic which may include the ML model(s) 224, mathematic probabilistic similarity logic (PSL), and/or the like or as may become apparent to one skilled in the art.

At 338, the FF component 208 may determine domain name randomness. For example, the FF component 208 may use the ML model(s) 224, a detection algorithm, and/or the like. For instance, the FF component 208 may utilize high entropy domain name system (DNS) queries using a URL toolbox Shannon Entropy calculator and/or the like. As such, the calculator may determine a given query's entropy scoring. Further, a predetermined entropy score may be set where entropy scores of the given query, in excess of the predetermined entropy score, may be indicative of an algorithmically generated domain address (e.g., indicative of a fraudulently generated domain address).

Following operation 338, the method 300 may proceed to operation 356 which will be described in more detail in FIG. 3D.

Accordingly or alternatively, another operation may intercede the procession to the operation 356 wherein the brand (i.e., organization) name(s) determined to this point may be saved. In some instances, the brand name(s) may be saved to the saved brand possibilities 226 of the storage 220. In some other instances, the brand name(s) may be saved to cloud storage, other computational devices, other storage, and/or the like and may be transferred to any such devices via the network 108. In some further instances, the brand name(s) determined may serve to train the ML model(s).

Figure 3B:
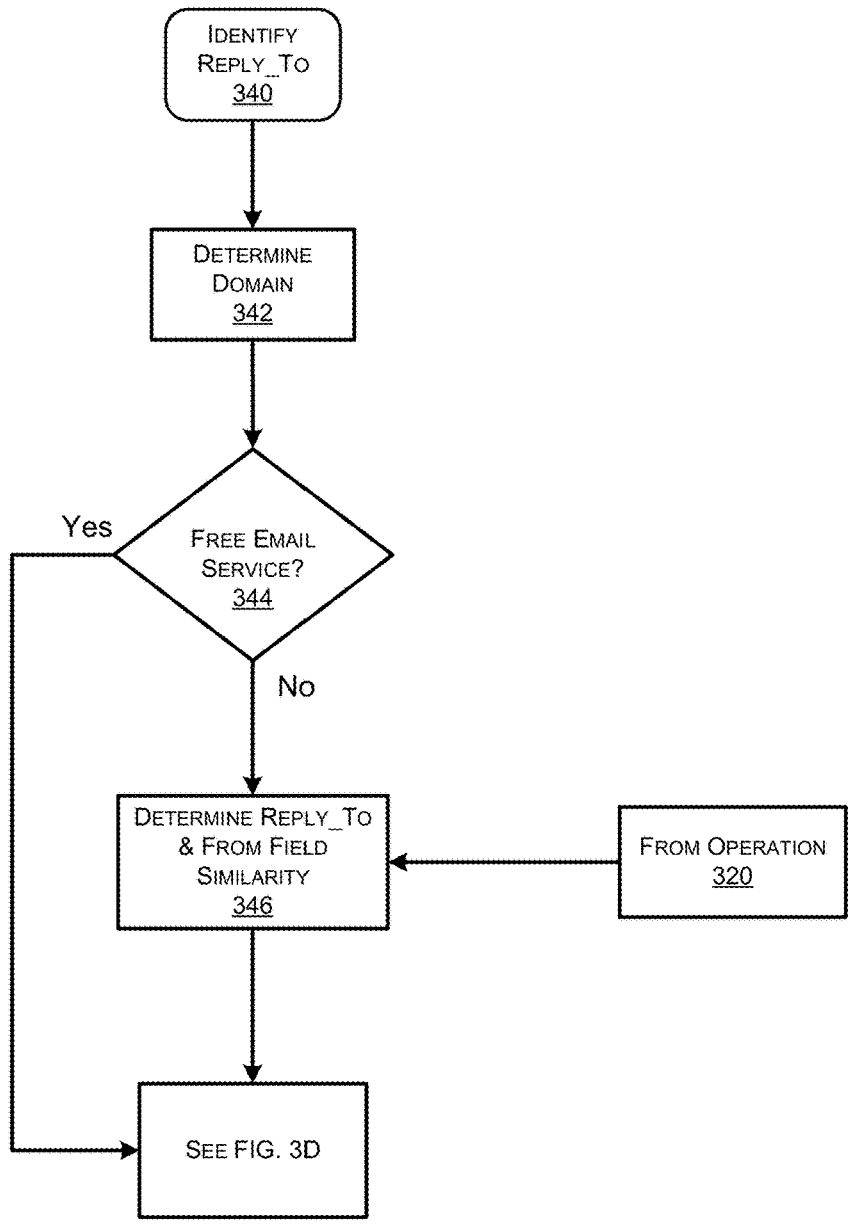
FIG. 3B illustrates a flow diagram of an example method for an email-security system to determine a similarity between a reply to field and a from field.

FIG. 3B illustrates a flow diagram of an example method 300 for extracting information and/or data from the "Reply-To Field" of the screened email 114 of an email-security system that is further configured to detect an email, assign a probability score, and use the probability score classify the email as an authentic email or a fraudulent email. The email-security system 102 may monitor emails communicated between users of email platforms or services to detect fraudulent emails, phishing emails, and/or other malicious emails.

At 340, the reply-to analysis component (hereinafter referred to as the "RT component") 212 may identify reply-to information of a scanned email 114. The RT component 212 may identify the reply-to information using text recognition, NLP model(s), predetermined field analysis, and/or the like.

At 342, the RT component 212 may determine a reply-to domain. For example, the RT component 212 may be directed to a portion of the scanned email 114 detailing the reply-to domain associated with the scanned email 114. In some other instances, the RT component 212 may use textual recognition and/or NLP model(s) to determine the domain of the reply-to field of the scanned email 114.

At 344, the RT component 212 may compare the determined from reply-to domain, at operation 330, to determine whether the reply-to domain address matches any free email service domains or not. For example, the RT component 212 may determine, at operation 330, that the from address domain is "from@realbrand.com." The RT component 212 may, at operation 332, determine that the domain (i.e., "@realbrand.com") does not match any free email service domains such as "@gmail.com," "@yahoo.com," "@hotmail.com," and/or the like. As such, the method 300 may proceed to the next operation.

A determination that the from reply-to domain, determined at operation 344, does not match any free email service domains (i.e., a "No" at operation 344) may cause the method 300 will proceed to operation 346.

At 346, the RT component 212 may determine any similarities between the reply-to address domain, found at operation 342, and the from-field address domain determined at operation 320. For example, if both the from-field address domain and the reply-to field address domain are similar, it may imply that the email is less likely fraudulent. Alternatively, in an instance where the from field address domain and the reply-to field address domain are dissimilar, this may indicate that the email is fraudulent.

Following operation 344 or a determination that the reply-to domain matches a free email service domain (i.e., a "Yes" at operation 344) the method 300 may proceed to operation 358 which will be described in more detail in FIG. 3D.

Figure 3C:
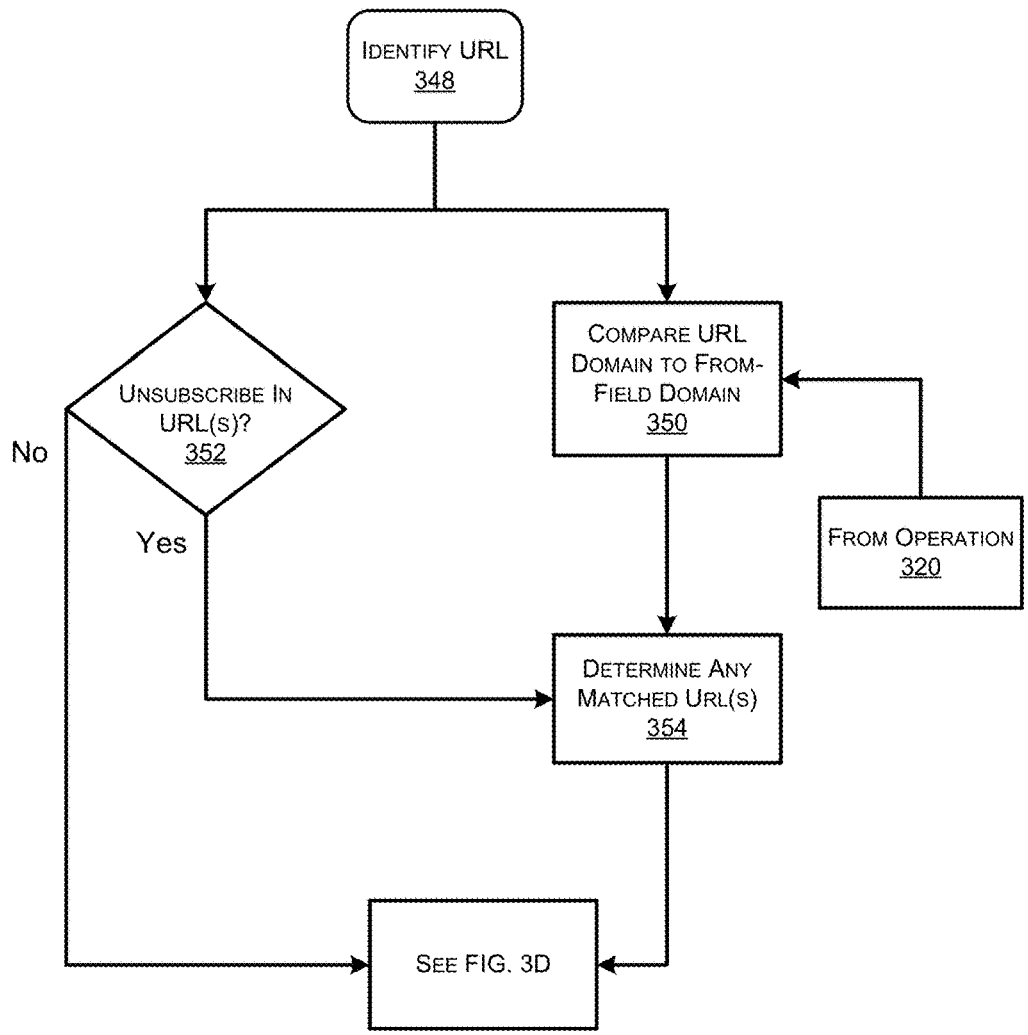
FIG. 3C illustrates a flow diagram of an example method for an email-security system to analyze URLs in an email.

FIG. 3C illustrates a flow diagram of an example method 300 for extracting any "URL" information and/or data of the screened email 114 of an email-security system that is further configured to detect an email, assign a probability score, and use the probability score classify the email as an authentic email or a fraudulent email. The email-security system 102 may monitor emails communicated between users of email platforms or services to detect fraudulent emails, phishing emails, and/or other malicious emails.

At 348, the URL analysis component (hereinafter referred to as the "URL component") 210 may identify any URL(s) contained within a scanned email 114. The URL component 210 may identify any URL(s) using text recognition, NLP model(s), predetermined field analysis, and/or the like.

At 350, the URL component 210 may compare the identified URL(s) within the screened email 114 to the from-address domains determined at operation 320 and determine whether any match exists.

At 352, the URL component 210 may determine whether there is any unsubscribe action and/or language with an associated and/or integrated URL(s). The URL component 210 may use text recognition, NLP model(s), and/or any other applicable process to identify and determine whether there is any unsubscribe action and/or language with an associated and/or integrated URL(s).

If there is a determination that there is any unsubscribe action and/or language with an associated and/or integrated URL(s) (i.e., a "Yes" at operation 352), then the method 300 proceeds to operation 354.

At 354, the URL component 210 may determine any matched URL(s) determine from operations 350 and/or 352. As such, at operation 354, the URL component 210 may determine the number of matched, unmatched, and/or total number of URL(s). In some other instances, the URL component 210 may further determine the number of matched URL(s) which are image(s). Further, the URL component 210 may determine the matching using a comparison logic.

Following operation 354, the method 300 may proceed to operation 360 which will be described in more detail in FIG. 3D.

FIG. 3D, illustrates a flow diagram of an example method 300 for an email-security system to detect an email, assign a probability score, and use the probability score classify the email as an authentic email or a fraudulent email. The email-security system 102 may monitor emails communicated between users of email platforms or services to detect fraudulent emails, phishing emails, and/or other malicious emails.

At 356, the FF component 208 may determine a from-field probability score from the processes naturally flowing from operation 302. As such, determining a match between the organization names determined, at operations 310 and 330, at operation 332 (i.e., a "Yes" at operation 332) may yield a lower probability score indicative that the screened email 114 is not fraudulent. Alternatively, a determination that the from address domain matches a free email service (i.e., a "Yes" at operation 322) or a determination that the from address domain matches a marketing mail service (i.e., a "Yes" at operation 324) may yield higher probability scores indicative that the screened email 114 is fraudulent. Accordingly or alternatively, a determination of domain name randomness at operation 338 where, for example, the threshold value is exceeded may yield a higher probability score indicative of fraud. The FF component 208, at operation 358, may combine the interrelated processes stemming from operation 302 and flowing into operation 358 and arrive at an overall from field probability score. In some instances, the overall from-field probability score may include determining individual scores for the processes and finding a mean, a median, a mode, a weighted average, and/or the like.

At 358, the RT component 212 may determine a reply-to probability score indicating a likelihood that the screened email 114 is fraudulent concerning the processes of the method 300 naturally flowing from operation 340. For example, the determination of the reply-to probability score may ultimately depend upon operation 344. As such, a "Yes" determination at operation 344 may yield a higher probability score, at operation 358, as the reply-to address domain matches a free email service domain. In other words, a match to a free email service domain may indicate that the attacker is directing the victim to reply to the victim's created, fraudulent email address and not an address associated with a legitimate brand. In some other instances, a "No" at operation 344 will lead to operation 346. As such, a reply-to address domain that is determined to be dissimilar to the from-field address domain may similarly indicate a likelihood that the screened email 114 is fraudulent and be assigned a higher probability score at operation 358. Further, RT component 212, at operation 358, may combine the interrelated processes stemming from operation 340 and flowing into operation 358 and arrive at an overall from field probability score. In some instances, the overall from-field probability score may include determining individual scores for the processes and finding a mean, a median, a mode, a weighted average, and/or the like.

At 360, the URL component 210 may determine a URL probability score from the processes naturally flowing from operation 348. As such, at operation 360, the URL component 210 may use the determination made at operation 354 to determine a URL probability score. For example, a determination of all URL(s) being matched, at operation 354, may be factored into the determination of a lower URL probability score at operation 360. In such instances, the URL probability score may be lower due to the matches indicating a higher likelihood that the screened email 114 is not fraudulent. Alternatively, in some further instances, a greater number of unmatched URL(s), as determined at operation 354, may result in the determination of a higher URL probability score at operation 360. As such, a higher number of unmatched URL(s) may indicate that the screened email 114 is fraudulent. In some further instances, the URL component 210 may, from a "No" determination at operation 352, determine a higher probability score at operation 360. For example, emails from legitimate brands often contain unsubscribe language and an omittance of such language may be indicative of fraud. Further, URL component 210, at operation 360, may combine the interrelated processes stemming from operation 348 and flowing into operation 360 and arrive at an overall from field probability score. In some instances, the overall from-field probability score may include determining individual scores for the processes and finding a mean, a median, a mode, a weighted average, and/or the like.

The foregoing operations 358, 360, and/or 362 may be determined independently and/or within a single smart probability calculation function. Accordingly or alternatively, the forgoing operations 356, 358, and/or 360 may be performed in any suitable way and/or method made apparent to one skilled in the art.

At 362, the final probability & classification component (hereinafter referred to as the "FP&C component") 218 may determine a final probability and classification from the method 300. The FP&C component 218, at operation 362 may combine the three interrelated processes stemming from method 300 and arrive at an overall from final probability score and classification for the screened email 114. The final probability score may be determined by taking the individual probability scores determined at operations 356, 358, and/or 360 and finding a mean, a median, a mode, a weighted average, and/or the like. Additionally, the FF&C component 218 may use the final probability score to classify the screened email 114 as fraudulent or not. As described and/or alluded to herein, classification as fraudulent may result where the final probability score exceeds a predetermined threshold value. For example, a predetermined threshold value may be 0.75 where any final probability score exceeding the threshold value may case the FF&C component 218 to classify the screened email 114 as fraudulent. Additionally or alternatively, at operation 362, the FP&C component 218 may further determine a legitimate brand name targeted and/or a possible spoof of the legitimate brand name targeted. For instance, the FP&C component 218 may determine that legitimate brand "RealBrand" was intended while the possible spoof "RealBrand" was attempted and/or including a determination that a homoglyph (described in more detail in FIG. 5) was used.

In some instances, the method 300 may include additional and/or different processes. For example, a certificate probability score may be determined associated with certificates. In such instances, the method 300 may begin by identifying a first domain name, at operation 320, and a second domain name, at operation 342. As such, the method 300 may continue by identifying, using the first domain name and the second domain name, an associated certificate. Additionally, using the associated certificate, the method 300 may determine an owner. The method 300 may then identify a brand associated with the owner and compare the brand to a displayed brand name and/or display name from the screened email 114. Additionally, the method 300 may determine, based at least upon the comparison, whether the displayed brand name and/or display name of the screened email 114 match and/or correspond to the name of the brand associated with the owner and determine the certificate probability score based at least in part on a degree to which a similarity and/or correspondence is determined.

In some further instances, the method 300 may determine a WHOIS probability score associated with WHOIS information. For example, the method 300 may identify a first domain name and a second domain name associated with any URL(s) found in the screened email 114. Additionally, the method 300 may, using the first domain name and the second domain name, identify a one or more associated, registered domains and determine an owner from the one or more associated, registered domains. The method 300 may then identify a brand associated with the owner and compare the brand to a displayed brand name and/or display name from the screened email 114. Additionally, the method 300 may determine, based at least upon the comparison, whether the displayed brand name and/or display name of the screened email 114 match and/or correspond to the name of the brand associated with the owner and determine the WHOIS probability score based at least in part on a degree to which a similarity and/or correspondence is determined.

Figure 4:
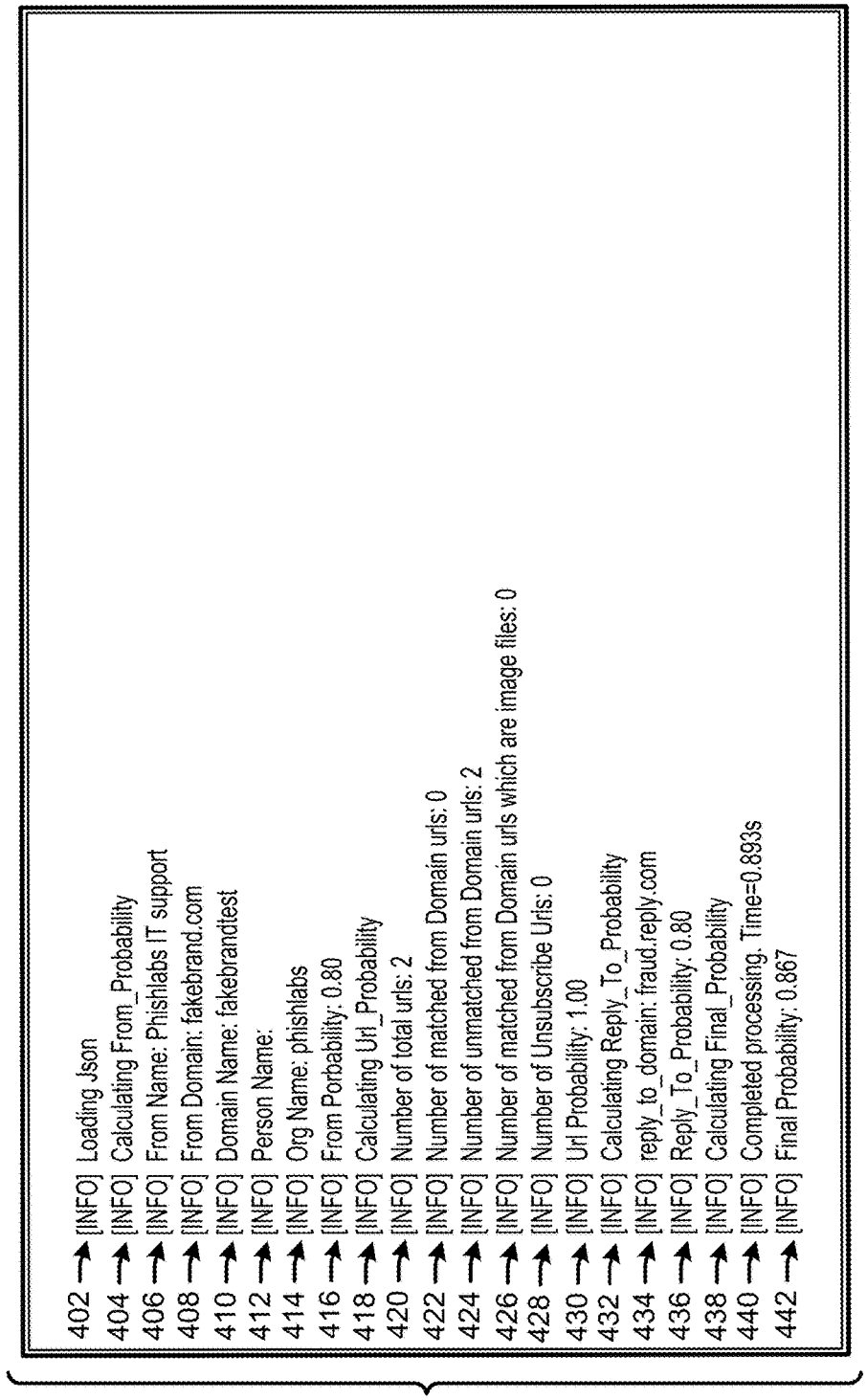
FIG. 4 illustrates an example impersonated email probability determination sequence used by an email-security system to detect fraudulent emails.
Figure 4:

FIG. 4 illustrates an example probability determination sequence 400 associated with the impersonated email probability 228 used by an email-security system to detect fraudulent emails.

At 402, the example probability determination may begin by loading JSON. JSON is an open standard file format and data interchange format that uses human-readable text to store and transmit data objects consisting of attribute-value pairs and arrays. The impersonated email probability 228 may utilize other formatting protocols including, but not limited to, YAML, Protobuf, Avro, MongoDB, OData, JavaScript, Python, and the like.

At 404, the impersonated email probability 228 may begin calculating the probability score relating to the data collected in the "From-Field" of the screened email 114.

At 406, the impersonated email probability 228 may indicate the collected information relating to a from name portion of the screened email 114. For example, the illustration depicts the from name to read "Phishlabs IT Support."

At 408, the impersonated email probability 228 may indicate the collected information relating to a from domain of the screened email 114. For example, the illustration depicts the from domain as "fakebrand.com."

At 410, the impersonated email probability 228 may indicate the collected information relating to a domain name of the screened email 114. For example, the illustration depicts the domain name to be "fakebrandtest."

At 412, the impersonated email probability 228 may indicate the collected information relating to a person name of the screened email 114. For example, the illustration depicts no information relating to the person name and leaves that field blank.

At 414, the impersonated email probability 228 may indicated the collected information relating to an organization name of the screened email 114. For example, the illustration depicts the organization name collected to be "phishlabs."

At 416, the impersonated email probability 228 may calculate the probability score associated with the collected "From-Field" information. For example, the illustration depicts that the "From-Field" probability score is "0.80."

At 418, the impersonated email probability 228 may begin calculating the probability score relating to "URL" data collected from the screened email 114.

At 420, the impersonated email probability 228 may indicate the collected information relating to the number of total URL(s) found within the screened email 114. For example, the illustration depicts that "2" URLs were found.

At 422, the impersonated email probability 228 may indicate a determination of how many domain URL(s) match. For example, the illustration depicts that "0" domain URLs match out of the "2" that were found.

At 424, the impersonated email probability 228 may indicate a determination of how many domain URL(s) are unmatched. For example, the illustration depicts that there are "2" unmatched domain URLs.

At 426, the impersonated email probability 228 may indicate a determination of how many domain URL(s) are matched which are image files. For example, the illustration depicts that there are "0" matched domain URLs that are image files.

At 428, the impersonated email probability 228 may indicate the collected information relating to the number of unsubscribe URL(s) found within the screened email 114. For example, the illustration depicts that "0" unsubscribe URLs were found.

At 430, the impersonated email probability 228 may calculate the probability score associated with the collected URL data. For example, the illustration depicts that the "URL" information probability score is "1.0."

At 432, the impersonated email probability 228 may begin calculating the probability score relating to "Reply-To Field" data collected from the screened email 114.

At 434, the impersonated email probability 228 may indicate the collected information relating to the reply-to field data. For example, the illustration depicts that the reply-to domain is "fraud.reply.com."

At 436, the impersonated email probability 228 may calculate the probability score associated with the collected "Reply-To Field" data. For example, the illustration depicts that the "Reply-To Field" probability score is "0.80."

At 438, the impersonated email probability 228 may indicate the beginning of a final probability calculation from the previously calculated probability scores.

At 440, the impersonated email probability 228 may indicate that the previous step, at 438, has been completed with an accompanying time duration that the calculation spanned. For example, the illustration depicts that the final probability score was calculation in "0.893" seconds.

At 442, the impersonated email probability 228 may display the final probability score. For example, the illustration depicts and averaged probability score, of the previous three probability scores, that the screened email 114 has a probability score of "0.867" indicating that the screened email 114 is fraudulent.

It should be noted that the foregoing steps of the impersonated email probabilities 228 is merely exemplary. As such, steps may be added or removed. For example, an additional step indicating a classification that the screened email 114 is fraudulent, or not fraudulent, may be included and/or added.

Figure 5:
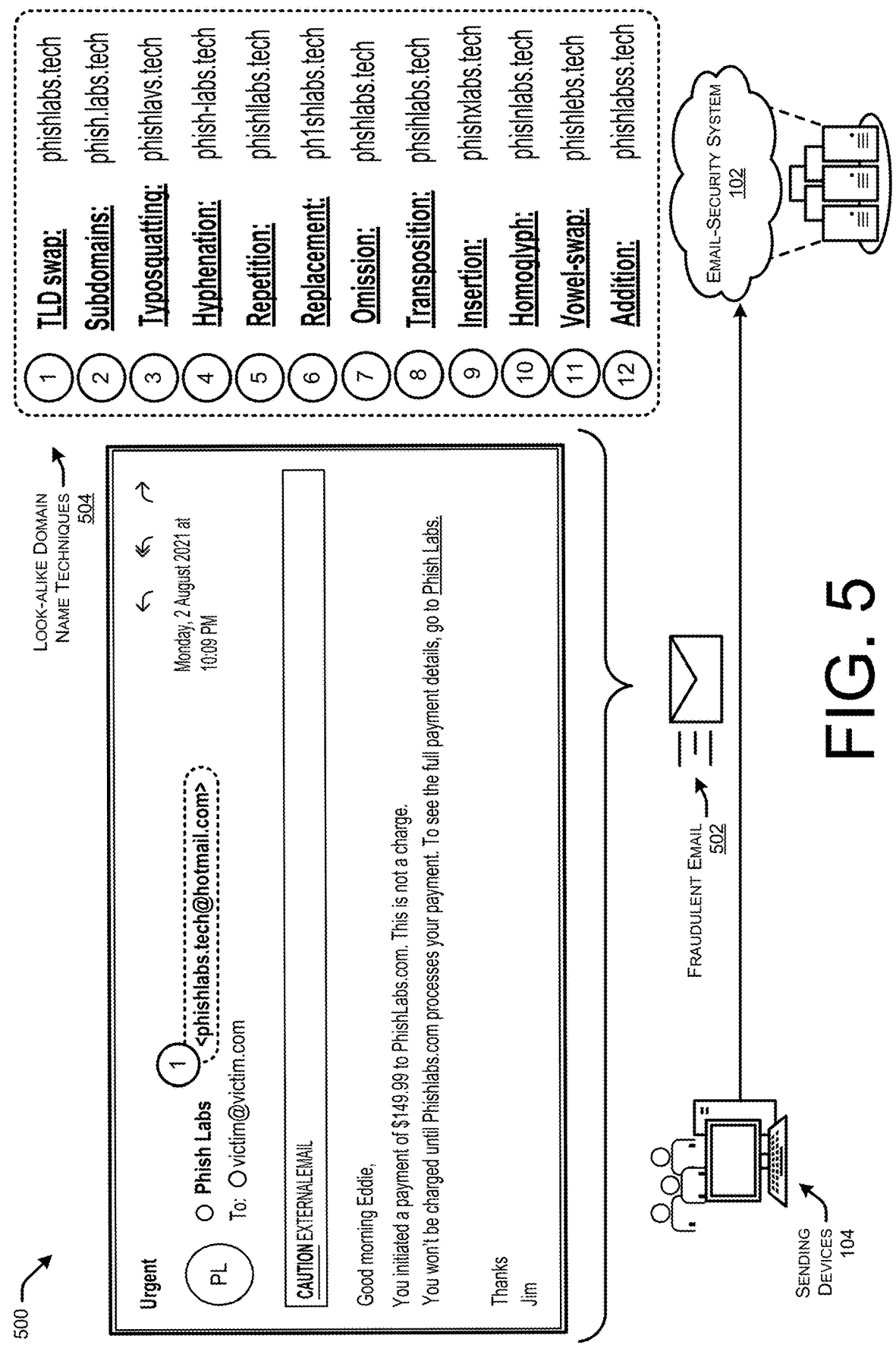
FIG. 5 illustrates an example of a fraudulent email that is detected by an email-security system.

FIG. 5 illustrates an example 500 of a fraudulent email 502 that is detected by the email-security system 102. As shown, the screened email 114 illustrated is a payment request fraudulent email where an attacker is pretending to be someone that the victim/target owes a payment to. The email 114 includes a request for payment. Scammers may employ a number of look-alike domain name techniques 502 to deceive their victim/target. In such instances, the look-alike domain name technique 502 used will appear, to the victim/target, to be a legitimate brand. In this example, the look-alike domain name technique 502 being employed, at "1," is known as a top-level domain (TLD) swap. As shown, at "1," the attacker includes the name of the legitimate brand (i.e., phishlabs) followed by the insertion of the TLD swap (i.e., .tech) in an attempt to mislead the victim/target into believing the domain to be legitimate and/or associated with a legitimate brand.

In some other examples, attackers may, at "2," employ the use of subdomains. In such instances, the attacker may attempt to mislead the victim/target by using legitimate domains, but separating it, and creating a fraudulent domain, with the insertion of dots. For example, at "2," the attacker inserts a dot between "phish" and "labs" which makes "labs" a subdomain. The victim/target may view the domain and determine that it is legitimate and/or associated with a legitimate brand because the domain contains the elements of a legitimate domain. It should be appreciated that the insertion of dots, creating subdomains, breaks the legitimacy of the domain although not necessarily readily, visually apparent to the victim/target.

In some further examples, attackers may, at "3," employ the use of typosquatting. In such instances, the attacker attempts to deceive the victim by deliberately misspelling the name of a legitimate organization's (e.g., brand's) domain. For example, at "3," the attacker deliberately changes the letter "b" to "v" so that the legitimate brand's domain reads as "phislays.tech" and not "phishlabs.tech." As such, the victim may not readily observe the misspelling and mistake the domain to be legitimate and/or associated with a legitimate brand.

In some other examples, attackers may, at "4," employ the use of hyphenation. In such instances, the attacker attempts to deceive the victim by hyphenating an otherwise legitimate domain. For example, at "4," the attacker inserts a hyphen between "phish" and "labs." While the domain may appear, to the victim, to be legitimate, the insertion of the hyphen renders the domain fraudulent.

In some other examples, attackers may, at "5," employ the use of repetition. In such instances, the attacker attempts to deceive the victim by repeating a letter and, without close inspection, may cause the victim to overlook the repetition and believe the domain to be legitimate and/or associated with a legitimate brand. For example, at "5," the attack repeats the letter "l." As such, the fraudulent domain contains two "ls" that may be easy to overlook by the victim. The addition of the additional letter renders the domain fraudulent.

In some other examples, attackers may, at "6," employ the use of replacement. In such instances, the attacker attempts to deceive the victim by replacing a letter, typically with a letter, number, and/or symbol closely resembling the replaced letter. For example, at "6," the attacker replaces the letter "i" with the number "1." As such, the victim may not readily notice the replacement and believe the domain to be legitimate and/or associated with a legitimate brand.

In some other examples, attackers may, at "7," employ the use of omission. In such instances, the attacker attempts to deceive the victim by omitting an element of the legitimate domain. For example, at "7," the attacker attempts to deceive the victim by removing the letter "i" from the domain. As such, the new, fraudulent domain is "phshlabs.tech" and not "phishlabs.tech" where the discrepancy may, to the victim, go unnoticed.

In some other examples, attackers may, at "8," employ the use of transposition. In such instances, the attacker attempts to deceive the victim by transposing elements of the legitimate brand domain. For example, at "8," the attacker switches the placement of the letters "i" and "s" leading the domain to read "phsilabs.tech." As such, this minor discrepancy may similarly go unnoticed by the victim, with the victim mistakenly believing the fraudulent domain to be legitimate and/or associated with a legitimate brand.

In some other examples, attackers may, at "9," employ the use of insertion. In such instances, the attacker attempts to deceive the victim by the insertion of an additional element into the legitimate domain. For example, at "9," the attacker inserts the letter "x" into the middle of the legitimate domain. As such, the fraudulent domain reads as "phishxlabs.tech" which may cause the victim to believe it to be legitimate and/or associated with a legitimate brand.

In some other examples, attackers may, at "10," employ the use of homoglyph. In such instances, the attacker attempts to deceive the victim by using homoglyphs or homographs in which the attacker abuses the similarities of character scripts to create fraudulent domains of legitimate brands to trick victims into clicking. For example, at "10," the attacker replaces the letter "h" with the letters "l" and "n" which, taken together (e.g., "ln"), bear a resemblance to the letter "h." As such, the victim may not recognize the subtle difference between the legitimate brand domain and the homoglyph attack.

In some other examples, attackers may, at "11," employ the use of vowel-swapping. In such instances, the attacker attempts to deceive the victim by swapping vowels to exploit victims' typos or inattention to the domain's construction. For example, at "11," the attacker replaces the letter "a" with the letter "e." As such, this may be a common typo made by victims due to the close proximity of these letters on standard keyboards and/or may play on the inattention of the victim in recognizing the variation from the legitimate domain construction.

In some other examples, attackers may, at "12," employ the use of addition. In such instances, the attacker attempts to deceive the victim by adding characters to the legitimate domain construction. For example, at "12," the attacker adds an additional letter "s" to the otherwise legitimate domain construction. As such, the element addition may go unnoticed by the victim and/or a quick pass over the fraudulent domain may appear to contain no issues. In such instances, the victim may believe the fraudulent domain to be legitimate and/or associated with a legitimate brand.

The foregoing list of look-alike domain name techniques 502 are merely exemplary and should not be construed as limiting. Additionally, the examples described and alluded to, with respect to look-alike domain name techniques 502, are similarly exemplary and it should be appreciated that additional techniques and/or variations may be contemplated and/or apparent to one skilled in the art.

Figure 6:
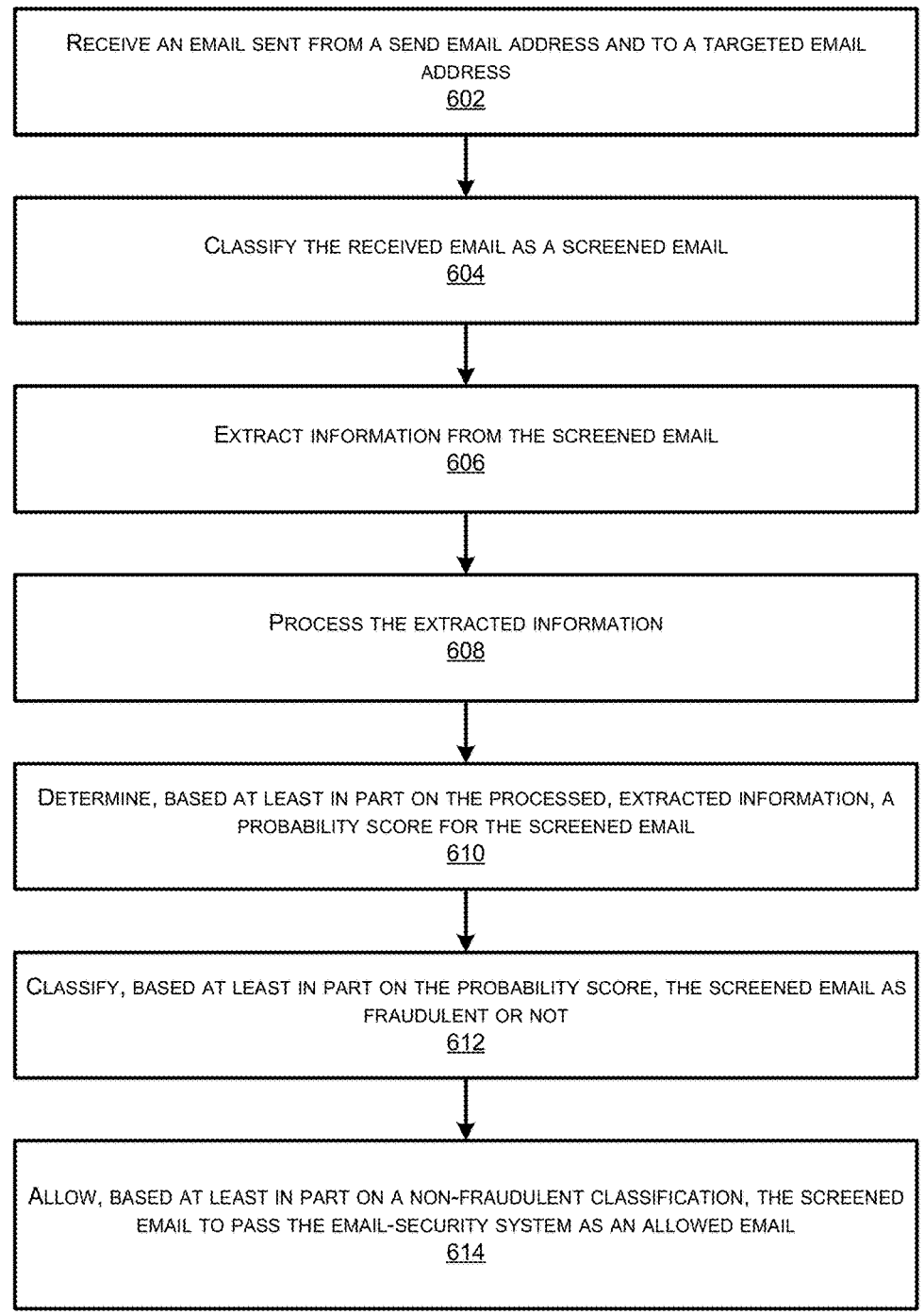
FIG. 6 illustrates a flow diagram of an example method for an email-security system to screen emails, analyze their contents, and assign a probability score and classification indicative of a probability that the screened email is fraudulent or not.

FIG. 6 illustrates a flow diagram of an example method 600 that illustrates aspects of the functions performed at least partly by the devices in the computing infrastructures as described in FIGS. 1-5. The logical operations described herein with respect to FIG. 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 6 and described herein. These operations can also be performed in parallel, or in a different order than those described herein. At least a portion of these operations can also be performed by any suitable components and/or as may become apparent to one skilled in the art. Although the techniques described in this disclosure is with reference to specific components, in other examples, the techniques may be implemented by less components, more components, and/or different components.

FIG. 6 illustrates a flow diagram of an example method for an email-security system to screen emails, analyze their contents, and assign a probability score and classification indicative of a probability that the screened email 114 is fraudulent or not. The techniques may be applied by a system comprising one or more processors, and one or more non-transitory computer-readable media storing computer-executable instructions that, when executed by the one or more processors, cause the one or more processors to perform operations of method 600.

At 602, an email-security system 102 may receive an email sent from a sending email address and to a targeted email address. For instance, the email-security system 102 may monitor emails communicated by an email service platform and obtain the email.

At 604, the email-security system 102 may classify the email as a screened email 114. For example, the processor(s) 202 may classify incoming emails as screened and initiate a process of analyzing them for fraud.

At 606, the email-security system 102 may extract information from the screened email 114. For example, the from-field analysis component 208, URL-analysis component 210, reply-to analysis component, and/or the like may extract data from the screened email 114 to determine that the screened email 114 is a fraudulent email directed at the target user.

At 608, the email-security system 102 may process the extracted information. For example, the various components may analyze extract data from the screened email 114 to determine that the screened email 114 is a fraudulent email directed at the target user. In such instances, the various components of the email-security system 102 may determine similarities, matches, presence of legitimate brand names, domains, etc. to be used in determining a probability score indicative of fraud.

At 610, the email-security system 102 may determine, based at least in part on the processed, extracted information, a probability score indicative of fraud for the screened email 114. For instance, the email-security system 102 may determine that there are discrepancies between from-field domain addresses and reply-to domain addresses. As such, these discrepancies may be indicative of the attacker attempting to deceive the victim into responding to a fraudulent reply-to domain address. In such instances, the email-security system 102 may determine a probability score indicative that the screened email 114 is fraudulent, based at least in part on the processed and extracted information.

At 612, the email-security system 102 may classify, based at least in party on the probability score, the screened email 114 as fraudulent or not. For instance, a predetermined threshold value (i.e., score) may be contained within the impersonated email probabilities 228. As such, a determined probability score in excess of the predetermined threshold value may be indicative of a fraudulent email. For example, the email-security system 102 may determine, at operation 610, a probability score for the screened email 114 of "0.9." Furthermore, a predetermined threshold score may be "0.75." As such, the probability score of the screened email 114 would exceed the threshold score and the email-security system 102 may classify, based at least in part on the probability score, that the screened email 114 is fraudulent.

At 614, the email-security system 102 may allow, based at least in part on a non-fraudulent classification, the screened email 114 to pass the email-security system 102 as an allowed email 110. As such, the allowed email 110 may be allowed to pass between the sending device(s) 104 and the receiving device(s) 106, along the network(s) 108, freely.

Figure 7:
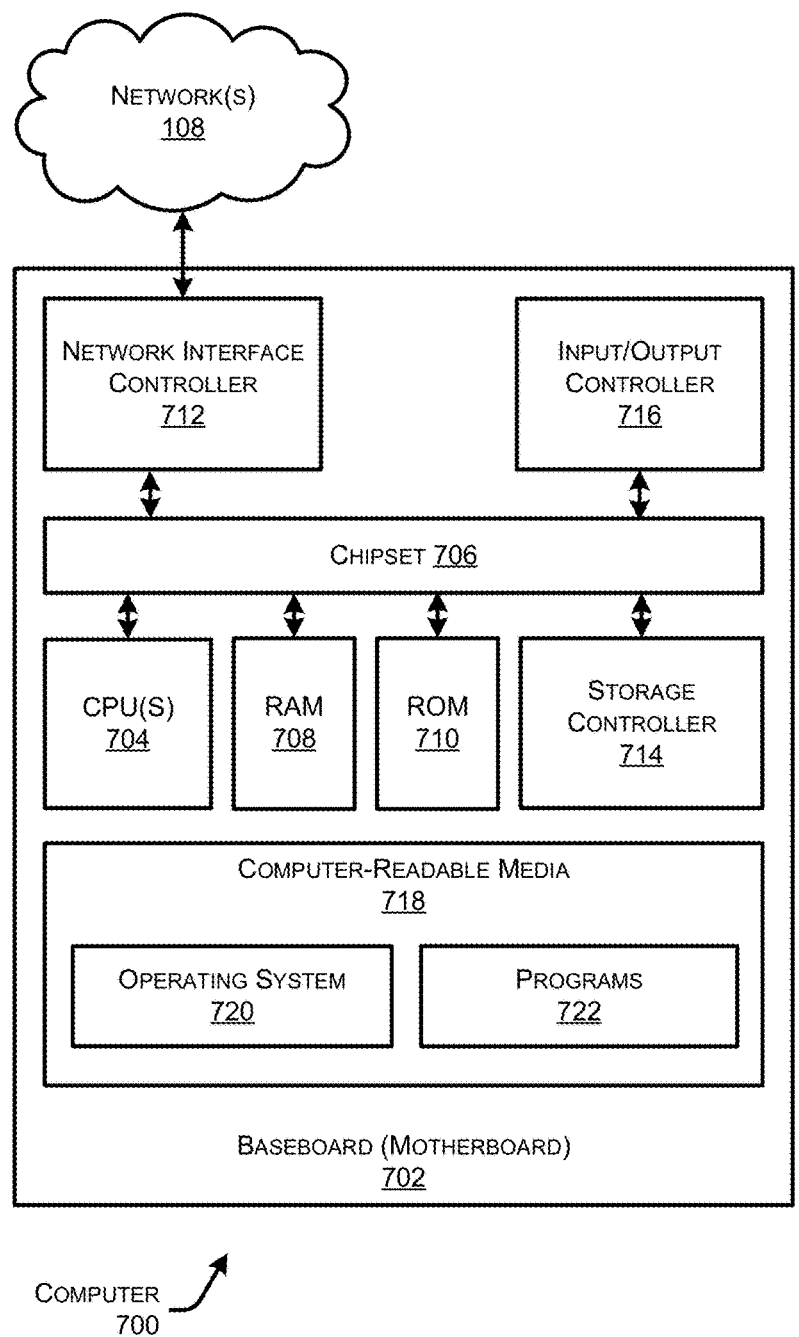
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The computer 700 may, in some examples, correspond to a physical server that is included in the email security-system 102 described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 708. The chipset 706 can include functionality for providing network connectivity through a NIC 712, such as a gigabit Ethernet adapter. The NIC 712 is capable of connecting the computer 700 to other computing devices over the network 708. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description.

Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by devices in a distributed application architecture, and or any components included therein, may be supported by one or more devices similar to computer 700. Stated otherwise, at least a portion of the operations performed by the email-security system 102, and or any components included therein, may be performed by one or more computer devices 700 operating in any system or arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one instance, the operating system comprises the LINUX operating system. According to another instance, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one example, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one example, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for an email-security system to detect malicious emails, the method comprising:
   obtaining, at an email-security system, an email sent from a sending device to a receiving device;
   extracting, from the email, first data representing a from field of the email, second data representing a Uniform Resource Locator (URL) in the email, and third data representing a reply-to address;
   identifying, using the first data, that a display name in the from field represents a brand name and that a from address domain in the from field does not represent the brand name;
   determining, based at least in part on the display name representing the brand name and the from address domain not representing the brand name, a first probability value indicating a first likelihood that the from field of the email is impersonating the brand name;
   determining, using the second data, whether a URL domain in the URL matches to the from address domain in the from field;
   determining, based on whether the URL domain matches to the from address domain, a second probability value indicating a second likelihood that the URL in the email is impersonating the brand name;
   determining, using the third data, whether a reply-to domain of the reply-to address corresponds to a free email service domain;

determining, based at least in part on whether the reply-to domain corresponds to the free email service domain, a third probability value indicating a third likelihood that the reply-to address in the email is impersonating the brand name; and determining, using the first probability value, the second probability value, and the third probability value, an overall probability value indicating an overall likelihood that the email is a malicious email that is impersonating the brand name.

2. The method of claim 1, further comprising:

comparing the from address domain name and a plurality of free email service domains; and determining the first probability value based at least in part on comparing the from address domain in the from field of the email and the plurality of free email service domains.

3. The method of claim 1, further comprising:

comparing the brand name with the URL domain;

determining, based at least in part on the comparing, whether the brand name corresponds to the URL domain; and determining the second probability value based at least in part on the determining whether the brand name corresponds to the URL domain.

4. The method of claim 1, further comprising:

comparing the from address domain with a plurality of free email service domains;

comparing the from address domain and the reply-to domain;

determining, based on the comparing whether the from address domain corresponds to the plurality of free email service domains and whether the from address domain corresponds to the reply-to domain; and determining the third probability value, based at least in part on the determining whether the from address domain corresponds to the plurality of free email service domains and whether the from address domain corresponds to the reply-to domain.

5. The method of claim 1, further comprising:

identifying, using the first data, the second data, and the third data, an associated certificate;

determining, using the associated certificate, an owner;

identifying, using the owner, a corresponding name of the brand associated with the owner;

determining, using the first data, a displayed brand name and a display name of the email;

comparing the from address domain and the display name of the email to the name of the brand associated with the owner;

determining, based at least on the comparing whether the from address domain and the display name of the email correspond to the name of the brand associated with the owner; and determining a fourth probability value, based at least in part on the determining whether the from address domain and the display name of the email correspond to the name of the brand associated with the owner.

6. The method of claim 1, further comprising:

identifying, from the email, a selectable option for the receiving device to unsubscribe from additional emails;

extracting, from the email, an unsubscribe URL associated with the selectable option; and comparing the unsubscribe URL and the from address domain, wherein the determining the second probability value indicating the second likelihood that the email is impersonating the brand name is based at least in part on the comparing the URL and the from address domain.

7. The method of claim 1, further comprising:

identifying an image included in the email;

identifying, from image data associated with the image, an image URL; and comparing the image URL and the from address domain;

wherein the determining, based at least in part on comparing the image URL and the from address domain, the second probability value indicating the second likelihood that the email is impersonating the brand name is based at least in part on the comparing the image URL and the from address domain.

8. The method of claim 1, further comprising:

identifying, using the first data, the second data, and the third data, an associated Whois database entry;

determining, from the associated Whois database entry, a registrant;

identifying a name of the brand associated with the registrant;

comparing the display name of the email to the name of the brand associated with the registrant; and determining a seventh probability value, based at least in part on the comparing whether the display name of the email corresponds to the name of the brand associated with the registrant.

9. A system comprising:

one or more processors; and one or more non-transitory computer-readable media storing computer-executable instructions that, when executed by the one or more processors, cause the one or more processor to perform operations comprising:

obtaining, at an email-security system, an email sent from a sending device to a receiving device;

extracting, from the email, first data representing a from field of the email, second data representing a Uniform Resource Locator (URL) in the email, and third data representing a reply-to address;

identifying, using the first data, that a display name in the from field represents a brand name and that a from address domain in the from field does not represent the brand name;

determining, based at least in part on the display name representing the brand name and the from address domain not representing the brand name, a first probability value indicating a first likelihood that the from field of the email is impersonating the brand name;

determining, using the second data, whether a URL domain in the URL matches to the from address domain in the from field;

determining, based on whether the URL domain matches to the from address domain, a second probability value indicating a second likelihood that the URL in the email is impersonating the brand name;

determining, using the third data, whether a reply-to domain of the reply-to address corresponds to a free email service domain;

determining, based at least in part on whether the reply-to domain corresponds to the free email service domain, a third probability value indicating a third likelihood that the reply-to address in the email is impersonating the brand name; and determining, using the first probability value, the second probability value, and the third probability value, an overall probability value indicating an overall likelihood that the email is a malicious email that is impersonating the brand name.

10. The system of claim 9, further comprising:
comparing the from address domain and a plurality of free email service domains; and
determining the first probability value based at least in part on comparing the from address domain in the from field of the email and the plurality of free email service domains.

11. The system of claim 9, further comprising:
comparing the brand name with the URL domain;
determining, based at least in part on the comparing, whether the brand name corresponds to the URL domain; and
determining the second probability value based at least in part on the determining whether the brand name corresponds to the URL domain.

12. The system of claim 9, further comprising:
comparing the from address domain with a plurality of free email service domains;
comparing the from address domain and the reply-to domain;
determining, based on the comparing, whether the from address domain corresponds to the plurality of free email service domains and whether the from address domain corresponds to the reply-to domain; and
determining the third probability value, based at least in part on the determining whether the from address domain corresponds to the plurality of free email service domains and whether the from address domain corresponds to the reply-to domain.

13. The system of claim 9, further comprising:
identifying, using the first data, the second data, and the third data, an associated certificate;
determining, using the associated certificate, an owner;
identifying, using the owner, a corresponding name of the brand associated with the owner;
determining, using the first data, a displayed brand name and a display name of the email;
comparing the from address domain and the display name of the email to the name of the brand associated with the owner;
determining, based at least on the comparing whether the from address domain and the display name of the email correspond to the name of the brand associated with the owner; and
determining a fourth probability value, based at least in part on the determining whether the from address domain and the display name of the email correspond to the name of the brand associated with the owner.

14. The system of claim 9, further comprising:
identifying, from the email, a selectable option for the receiving device to unsubscribe from additional emails;
extracting, from the email, an unsubscribe URL associated with the selectable option; and
comparing the unsubscribe URL and the from address domain,
wherein the determining the second probability value indicating the second likelihood that the email is impersonating the brand name is based at least in part on the comparing the URL and the from address domain.

15. The system of claim 9, further comprising:
identifying an image included in the email;
identifying, from image data associated with the image, an image URL; and
comparing the image URL and the from address domain;
wherein the determining, based at least in part on comparing the image URL and the from address domain, the second probability value indicating the second likelihood that the email is impersonating the brand name is based at least in part on the comparing the image URL and the from address domain.

16. The system of claim 9, further comprising:
identifying, using the first data, the second data, and the third data, an associated Whois database entry;
determining, from the associated Whois database entry, a registrant;
identifying a name of the brand associated with the registrant;
comparing the display name of the email to the name of the brand associated with the registrant; and
determining a seventh probability value, based at least in part on the comparing whether the display name of the email corresponds to the name of the brand associated with the registrant.

17. One or more non-transitory computer-readable media storing computer-executable instructions that, when executed by one or more processors, cause the one or more processors to perform operations comprising:
obtaining, at an email-security system, an email sent from a sending device to a receiving device;
extracting, from the email, first data representing a from field of the email, second data representing a Uniform Resource Locator (URL) in the email, and third data representing a reply-to address;
identifying, using the first data, that a display name in the from field represents a brand name and that a from address domain in the from field does not represent the brand name;
determining, based at least in part on the display name representing the brand name and the from address domain not representing the brand name, a first probability value indicating a first likelihood that the from field of the email is impersonating the brand name;
determining, using the second data, whether a URL domain in the URL matches to the from address domain in the from field;
determining, based on whether the URL domain matches to the from address domain, a second probability value indicating a second likelihood that the URL in the email is impersonating the brand name;
determining, using the third data, whether a reply-to domain of the reply-to address corresponds to a free email service domain;
determining, based at least in part on whether the reply-to domain corresponds to the free email service domain, a third probability value indicating a third likelihood that the reply-to address in the email is impersonating the brand name; and
determining, using the first probability value, the second probability value, and the third probability value, an overall probability value indicating an overall likelihood that the email is a malicious email that is impersonating the brand name.

18. The one or more non-transitory computer-readable media of claim 17, further including:
comparing the from address domain and a plurality of free email service domains; and
determining the first probability value based at least in part on comparing the from address domain in the from field of the email and the plurality of free email service domains.

19. The one or more non-transitory computer-readable media of claim 18, further including:
   comparing the brand name with the URL domain;
   determining, based at least in part on the comparing, whether the brand name corresponds to the URL domain; and
   determining the second probability value based at least in part on the determining whether the brand name corresponds to the URL domain.

20. The one or more non-transitory computer-readable media of claim 17, further including:
   comparing the from address domain with a plurality of free email service domains;
   comparing the from address domain and the reply-to domain;
   determining, based on the comparing, whether the from address domain corresponds to the plurality of free email service domains and whether the from address domain corresponds to the reply-to domain; and
   determining the third probability value, based at least in part on the determining whether the from address domain corresponds to the plurality of free email service domains and whether the from address domain corresponds to the reply-to domain.

* * * * *